US011138620B1

(12) United States Patent
Rabenold

(10) Patent No.: US 11,138,620 B1
(45) Date of Patent: Oct. 5, 2021

(54) GUARANTEED OFFER GENERATOR

(71) Applicant: XCIRA, INC, Tampa, FL (US)

(72) Inventor: Nancy J. Rabenold, Brandon, FL (US)

(73) Assignee: XCIRA, INC, Tampa, FL (US)

( * ) Notice: Subject to any disclaimer, the term of this patent is extended or adjusted under 35 U.S.C. 154(b) by 199 days.

(21) Appl. No.: 16/359,023

(22) Filed: Mar. 20, 2019

Related U.S. Application Data

(63) Continuation-in-part of application No. 16/118,394, filed on Aug. 30, 2018, now Pat. No. 10,825,085, which is a continuation of application No. 13/706,831, filed on Dec. 6, 2012, now Pat. No. 10,096,060.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0206* (2013.01); *G06Q 30/0204* (2013.01); *G06Q 30/0278* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 3,933,305 A * | 1/1976 | Murphy | ............... | G06G 1/0073 235/70 A |
| 6,393,406 B1 * | 5/2002 | Eder | ...................... | G06Q 10/06 705/7.37 |
| 7,363,266 B1 * | 4/2008 | Williams | ............... | G06Q 40/06 705/36 R |
| 8,645,193 B2 * | 2/2014 | Swinson | ............... | G06Q 10/06 705/7.35 |
| 2012/0005108 A1 * | 1/2012 | Hollenshead | .......... | G06Q 30/02 705/306 |
| 2014/0164259 A1 * | 6/2014 | Hildreth | ............. | G06Q 30/0278 705/306 |
| 2017/0109799 A1 * | 4/2017 | Swinson | ............. | G06Q 30/0278 |
| 2018/0374150 A1 | 12/2018 | Rabenold et al. | | |
| 2020/0320584 A1 * | 10/2020 | Rabenold | ........... | G06Q 30/0278 |

OTHER PUBLICATIONS

Bryce Warnes, "What Is Depreciation? and How Do You Calculate It?" Retrieved from https://bench.co/blog/tax-tips/depreciation/ (Year: 2020).*

No author, "Depreciation Methods—4 Types of Depreciation You Must Know!" Retrieved from https://corporatefinanceinstitute.com/resources/knowledge/accounting/types-depreciation-methods/ (Year: 2020).*

* cited by examiner

*Primary Examiner* — Naeem U Haq
(74) *Attorney, Agent, or Firm* — Smith Tempel Blaha LLC; Gregory Scott Smith

(57) ABSTRACT

Automatically generating guaranteed offers for commodities and non-commodities As such, the present disclosure presents various embodiments, as well as features and aspects thereof, of a guaranteed offer generator ("GOG"). The GOG accumulates and assimilates data, and then algorithmically processes this data with a server system to generate a guaranteed offer that, while removing the risk of an asset owner relinquishing his or her property in response to a low-ball sell, does not create an unacceptably high risk on the part of the guaranteed offeror.

14 Claims, 8 Drawing Sheets

GUARANTEED OFFER GENERATOR

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) as a continuation-in-part of U.S. application Ser. No. 16/118,394 filed on Aug. 30, 2018, which application is a continuation of U.S. Pat. No. 10,134,086 issued on Nov. 20, 2018, which is a continuation of U.S. Pat. No. 10,096,060 issued on Oct. 9, 2018, all bearing the title of "INTEREST GAUGE BASED AUCTION". This application incorporates these applications and patents, as well as the following applications and patents herein by reference in their entirety:

U.S. Pat. Nos. 7,028,885, 7,364,075, and 8,739,059, United States Patent Publication Number US 2008-0195523 A1 and US 2008-0195520 A1.

BACKGROUND

As the saying coined by Benjamin Franklin states, "in this world, nothing is certain except death and taxes". In fact, as an interesting twist, it turns out that we are not even certain if Benjamin Franklin coined that term. According to the Yale Book of Quotes, it appears that the origin of the phrase may be in dispute, as Christopher Bullock is credited with the quote "'Tis impossible to be sure of anything but Death and Taxes" in The Cobler of Preston (1716) and Edward Ward is credited with the quote "Death and Taxes, they are certain" in The Dancing Devils (1724).

But imagine a world in which one could receive a guaranteed sell of an item or service. Sure, you have heard people advertise such a noble concept, but it turns out that the removal of the risk from seller is only amplified in such situations. The risk that was normally assumed by the seller of a good or service is transferred to the party providing the guaranteed offer. This could be a consigner, an auction house and/or a third party investor.

There is certainly a need in the art for the concept of a guaranteed offer; but the risks associated with such a guarantee is most likely guaranteed to make sure that guaranteed offers are few and far between.

What is needed in the art is a technique to provide the benefit of a guaranteed offer while at the same time mitigating the risk of loss transferred to the guarantor.

In view of the radical advancements in worldwide connectivity through mediums such as the World Wide Web, cellular infrastructure, etc., there remains a need in the art for the logistical implementation and integration of these capabilities into real-life scenarios. Often times, the lack of knowledge, understanding, and/or imagination can be a stumbling block for various business entities, market segments, and industries to fully comprehend and incorporate such technological advancements into their world and to fully reap the benefit of such advancements.

One industry that has seen radical change attributable to the growth in network communications technology is the merchandising industry. Long-time, stable, brick-and-mortar establishments have completely disappeared from the skyline while network-based retail stores thrive. Who would have thought that Blockbusters would wind up busted, or Toys-R-Us would soon concede that Toys-Were-Us. The merchandising industry had been hit across the board at various degrees including retail stores, consignment stores, rental stores, auction houses, etc. Looking further at the auction industry, which was at one time limited to the noise and bustle of the auctioning floor in an auction house with the yipping of the auctioneer, but has now been opened up to participants that remain in their office or at home, or at another auction house while bidding and following items in an auction house half-way across the country. This has been accomplished by bringing the auction houses online such that a person can watch items and bid on items just as though he or she was standing in the lane.

Although great advancements have been made in the auctioning industry from the perspective of access or remote participation, little has been done to change the overall structure or operation of the auction process. More specifically, the great advancements in technology and connectivity that are available to help guide and run businesses in this age of connectivity and data warehousing have not been fully exploited to revolutionize the auction industry. As a result, much of the operation of auctions remains the same and auctions tend to be one-dimensionally focused. For example, in an auto auction, as each vehicle is brought into the lane, the auction house, the bidders, the auctioneer, etc., are all focused on that single car. The auctioneer is trying to find a buyer—he is scanning the audience and watching the bidders in an attempt to find an interest that can be leveraged to sell the current vehicle. The bidders are looking at the product and deciding if it would meet their particular needs for the particular moment, be it transportation, leasing, reselling, refurbishment, parts, etc.

The auctioning industry, on-line retail, estate sales, and pretty much any form of merchandising could benefit from an implementation of a guaranteed offer. However, the auction industry and consignment industries are particularly suited for this capability. In the auction and consignment industries, there is a substantial risk to sellers in putting their products up for sale. The risk is that the products will not bring in a sales price that is commensurate with the value of the product and as thus, the owner feels as though they would be cheated. To combat this, property owners have traditionally used a reserve price, which is a minimum that the bidding must reach before a sale will be accepted. This approach can alleviate most of the risk to the property owner but it substantially increases the risk to the entity conducting the sale. The risk to the selling entity is that they can expend considerable effort in an attempt to sell the products; but if the reserve prices are not achieved, the work is all in vain. A guaranteed offer is a solution that can alleviate the risk to the product owner while providing some mitigation to the risk imposed on the selling entity.

What is needed in the art is a solution to integrate guaranteed offers into auctioning and consignment industries as well as all face-to-face and on-line merchandising.

SUMMARY

The present disclosure presents various embodiments, as well as features and aspects thereof, for a system and method for automatically generating guaranteed offers for commodities and non-commodities As such, the present disclosure presents various embodiments, as well as features and aspects thereof, of a guaranteed offer generator ("GOG").

In general, the operation of the GOG can be described as accumulating and assimilating a wide array of data and then algorithmically processing this data with a server system to generate a guaranteed offer that, while removing the risk of an asset owner relinquishing his or her property in response to a low-ball sell, does not create an unacceptably high risk on the part of the guaranteed offeror. To accomplish this, the GOG needs to be based on a wide variety of factors including the identification of a valid baseline price and adjustments to that baseline price brought about by depreciation/degradation of the asset, demographics and conversion probability. An exemplary GOG will thus include a depreciation/degradation assessment engine, a demographics assessment engine and a conversion probability assessment engine.

DETAILED DESCRIPTION OF VARIOUS EMBODIMENTS

Figure 1:
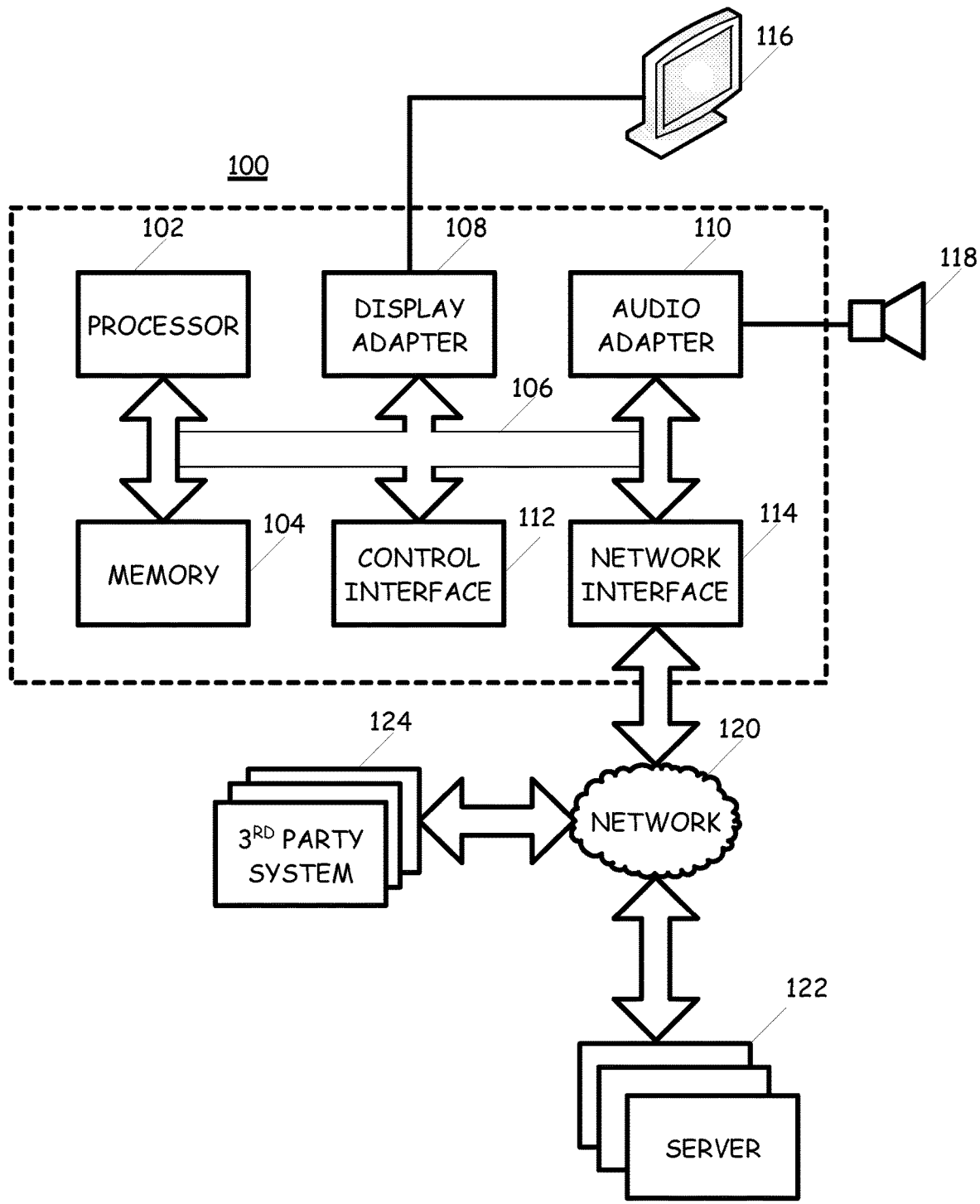
FIG. 1 is a functional block diagram of the components of an exemplary embodiment of the system or sub-system operating as a controller or processor 100 that could be used in various embodiments of the disclosure for controlling aspects of the various embodiments, implementing functions or engines, implementing the GOG or components thereof.

The present disclosure presents various embodiments, as well as features and aspects thereof, for a system and method for automatically generating guaranteed offers or commodities and non-commodities As such, the present disclosure presents various embodiments, as well as features and aspects thereof, of a guaranteed offer generator ("GOG").

In general, the operation of the GOG can be described as accumulating and assimilating a wide array of data, and then algorithmically processing this data with a server system to generate a guaranteed offer that—while removing the risk of an asset owner relinquishing his or her property in response to a low-ball sell—does not create an unacceptably high risk on the part of the guaranteed offeror. To accomplish this, the GOG needs to be based on a wide variety of factors, including the identification of a valid baseline price and adjustments to that baseline price brought about by depreciation/degradation of the asset, demographics and conversion probability. An exemplary GOG will thus include a depreciation/degradation assessment engine, a demographics assessment engine and a conversion probability assessment engine.

It should be appreciated that the term engine, as utilized within this document, refers to a system, apparatus or method for conducting the operations described within the engine. The engine can be a software module running on a computer system of a processing unit, a hardware system including chips and programmable logic, a combination of software and hardware, a server, a networked server, a group of servers communicatively coupled to each other either directly, wirelessly or wired, or through a network. The term engine is simply used as a catchall word to describe a functional unit that performs certain operations. While functional units may be described herein, it should be appreciated that these are not physical boundaries in that the functional units may be implemented on the same system or parts of a functional unit may be implemented on multiple systems.

An exemplary embodiment of the GOG is a method that automatically generates a guaranteed offer for an asset. It should be appreciated that the GOG has a real-time performance element associated therewith. For instance, in an auctioning scenario, the guaranteed offers may need to be generated on-the -ly as items are brought up to the stand, stage or into the lane. In a consignment setting, a patron may need the guaranteed offer on the spot prior to turning the asset over to the consigner. It should thus be appreciated that the operates that are set forth herein are necessarily embodied within a computing system that is connected to other resources through a network such that it can obtain information, process the information and generate a guaranteed over within seconds—and in some instances, less than a second.

In operation, the GOG receives a target item or the identification of a target item that is under consideration for being introduced into an acquisition procedure such as a sale, an auction, a consignment, a trade, etc. The GOG either operates to identify the asset or is provided with sufficient information to identify the asset. For instance, a VIN would be sufficient for identifying a vehicle but some assets may need to be analyzed to determine the essence of the asset.

Once the asset is identified, the GOG can invoke the baseline price assessment engine to identify a baseline price for the asset. The baseline price is used as a starting point for the guaranteed offer and in rare instances may actually be the guaranteed offer.

The GOG then invokes a depreciation assessment engine to obtain a depreciation value, a demographics assessment engine to obtain a demographics value and a conversion probability assessment engine to obtain a probability adjustment value. With these values, the GOG can modify the baseline price by the depreciation value, the demographics value and the probability adjustment value to generate the guaranteed offer for the target asset.

Advantageously, this results in generating a guaranteed offer that is based on a wide variety of factors that could have an impact on the conversion value of the asset.

One aspect that may be included in various embodiments of the GOG, or utilized in connection with the GOG, is termed a Buyer Interest Gauge. The Buyer Interest Gauge (BIG) generates an adjustment factor for a guaranteed offer that is based on a value or measuring stick of an asset in view of an acquiring entity, such as a purchaser, a buyer, a bidder, etc. The BIG is an automated system and/or process for identifying, quantifying, qualifying, and providing an interest indicator based on various parameters related to not just the participant but also to the assets of interest as well as services and other assets that may be related thereto. The BIG can be utilized by a potential buyer, seller, consignor or other interested parties in making purchase decisions but, can also be utilized by embodiments of the GOG in generating a guaranteed offer. Advantageously, the various embodiments facilitate the buyer's ability to understand his/her precise interest or benefit in purchasing a specific asset or groups of assets, based on his/her pre-defined/profiled needs, when assessed in view of a wide variety of other factors. Likewise, given a purchasing audience, the BIG can be used to gauge the level of interest that an asset will generate within the audience.

A few non-limiting examples of such factors may include the available inventory, the locations of the inventory, availability of inventory in lots, location, and sizes of the lots, the availability of transport for the inventory, aging of the inventory, source or manufacturer of the inventory, location of the buyer, destination location for the inventory, and other services and product related to the inventory such as packaging, testing, warehousing, etc.

In addition, with the BIG, a conversion facilitator (or seller) is better equipped to understand a potential purchaser's needs and interest and how better to market a product to that potential purchaser. For example, knowing that a customer needs a particular product, the ability to offer ancillary services related to the acquisition, delivery, processing, etc., of the product can be greatly advantageous. For instance, if a purchaser is turning away from a particular seller just because of the logistics involved in having the product delivered to the purchaser in a particular manner, the seller may have access to resources that can remedy any such logistical hurdles. Thus, the seller is able to not just identify obstacles that need to be overcome to make the purchase attractive to the potential buyer, but to also remedy the obstacles.

Even further, an auction house is uniquely situated to take great advantage of the BIG by having knowledge of not only what the buyers interest is focused on, but how that interest folds into the auction house's knowledge of what items and services are available to be offered or bundled together to create packages that can be bid upon in a combinatorial auction.

Another aspect or embodiment presented in the present disclosure is an automated system and/or process for providing "packaged" information to all of the participants of a transactional process, before and/or after the enactment of a transaction, such as but not limited to sellers, wholesalers, transporters, financers, etc.—typically but not always excluding buyers—but driven by the specific needs of the buyer.

Yet another aspect or embodiment presented in the present disclosure is an adaptive content management system that allows the conversion facilitator (e.g., seller, consignor, broker, agent, middleman) to manage the content of all technology components exercised in the fulfillment of a transaction based specifically on the need of the potential buyer. The content management system can be augmented by the employment of a decision architecture engine which operates to analyze the activity of a user or entity as presented or contained in the data warehouse and presents the content in a manner which optimizes the probability of a favorable reaction by the user.

Thus, one embodiment provides an automated process for providing a potential buyer with an understanding of his or her precise interest in purchasing a specific asset or groups of assets based on his or her pre-defined/profiled needs.

Within the context of the GOG, the BIG can just be one more factor that is used to adjust the baseline price or value of the asset.

Turning now to the figures, the various embodiments of the AMS as well as features and elements thereof are presented in more detail.

FIG. 1 is a functional block diagram of the components of an exemplary embodiment of the system or sub-system operating as a controller or processor 100 that could be used in various embodiments of the disclosure for controlling aspects of the various embodiments, implementing functions or engines, implementing the GOG or components thereof. It will be appreciated that not all of the components illustrated in FIG. 1 are required in all embodiments of the GOG but each of the components are presented and described in conjunction with FIG. 1 to provide a complete and overall understanding of the components. Further, in some embodiments, additional components not illustrated may be added for particular interfaces and functionality. The controller can include a general computing platform 100 illustrated as including a processor/memory device 102/104 that may be integrated with each other or communicatively connected over a bus or similar interface 106. The processor 102 can be a variety of processor types including microprocessors, micro-controllers, programmable arrays, custom IC's, etc., and may also include single or multiple processors with or without accelerators or the like. The memory element 104 may include a variety of structures, including but not limited to RAM, ROM, magnetic media, optical media, bubble memory, FLASH memory, EPROM, EEPROM, etc. The processor 102, or other components in the controller may also provide functionalities such as a real-time clock, analog-to-digital convertors, digital-to-analog convertors, etc. The processor 102 also interfaces to a variety of elements including a control interface 112, a display adapter 108, an audio adapter 110, and network/device interface 114. The control interface 112 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or another computer or processing device or the like. The display adapter 108 can be used to drive a variety of user interface elements 116, such as display devices including an LED display, LCD display, one or more LEDs or other display devices. The audio adapter 110 interfaces to and drives another alert element 118, such as a speaker or speaker system, buzzer, bell, etc. and may also interface to an input device such as a microphone. The network/interface 114 may interface to a network 120 which may be any type of network including, but not limited to, the Internet, a global network, a wide area network, a local area network, a wired network, a wireless network, or any other network type including hybrids. Through the network 120, or even directly, the controller 100 can interface to other devices or computing platforms such as one or more servers 122 and/or third party systems 124. A battery or power source provides power for the controller 100.

Figure 2:
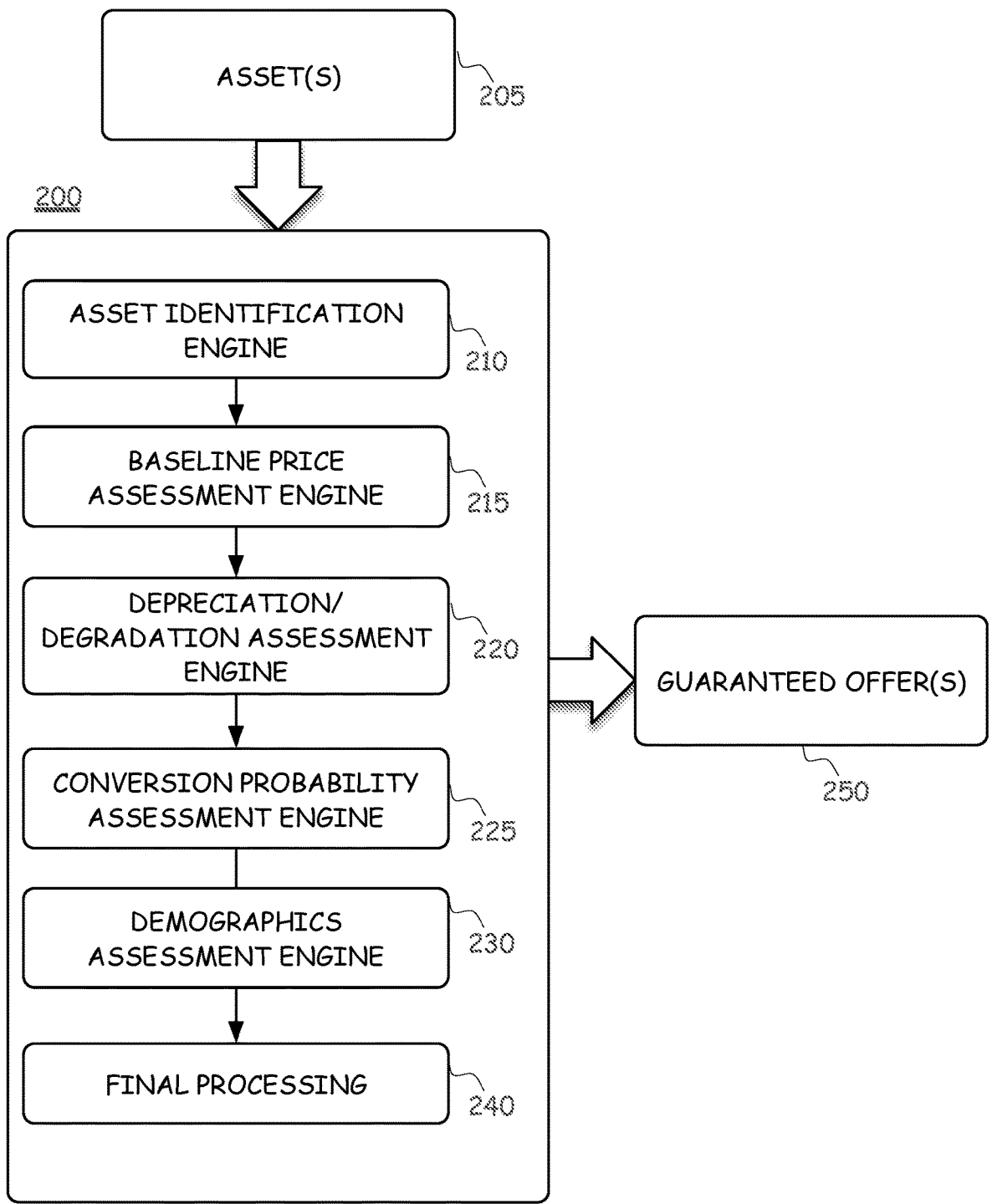
FIG. 2 is a functional block diagram illustrating an exemplary operation of a GOG.

FIG. 2 is a functional block diagram illustrating an exemplary operation of a GOG. An exemplary GOG 200 may include an asset identification engine 210, a baseline price assessment engine 215, a depreciation/degradation assessment engine 220, a demographics assessment engine 225 and a conversion probability assessment engine 230. One or more assets 205 are fed into the GOG 202. The form that the asset 205 is fed into the GOG 200 may vary on the embodiment but in general, may include a physical presentment, a description, a photograph, an identification number or a combination of two more or more of these inputs. The asset identification engine 210 is then invoked to identify the actual asset. Once the asset 205 is identified, the baseline price assessment engine is invoked to generate the baseline price or value of the asset 205. At this point, one or more of the following engines are invoked in any order, to make adjustments to the baseline price. The engines include the depreciation/degradation assessment engine 220, the conversion probability assessment engine 225, and the demographics assessment engine 230. Once all of the assessments have been performed, final processing is preformed 240 and then the GOG 200 spits out the guaranteed offer(s) 250 for each of the assets 205.

Asset Identification Engine—Asset Knowledge

The asset identification engine 210 may receive information that specifically identifies the asset, such as a model number, or that uniquely identifies the asset, such as a model number and serial number (i.e. VIN for vehicles). In other situation, the asset identification engine may simply receive describing information about the asset, such a narrative, a photograph or the item itself. In addition to identifying the asset, the asset identification engine, in various embodiments of the GOG, may also identify the condition, features, advantages, and other services and products related to various assets. This capability is generally referred to herein as asset knowledge.

Figure 3:
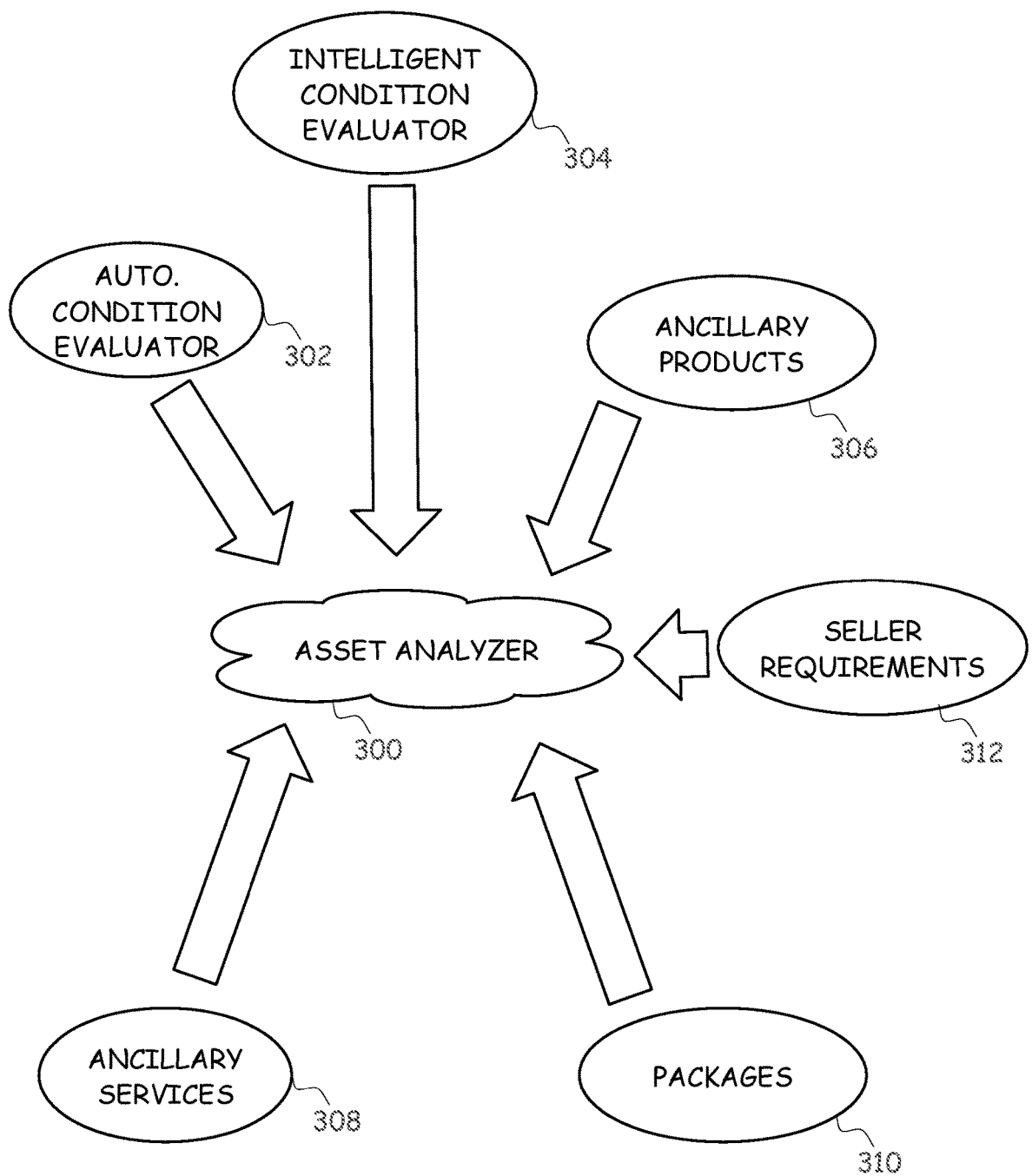
FIG. 3 is a functional block diagram illustrating an exemplary asset analyzer that could be utilized for obtaining and maintaining asset knowledge information.

FIG. 3 is a functional block diagram illustrating an exemplary asset analyzer that could be utilized for obtaining and maintaining asset knowledge information. The asset analyzer 300 is an exemplary server or computing environment for accessing and analyzing asset information. It should be appreciated that the asset analyzer is simply a functional aspect of the various embodiments and although it may operate as an independently functioning system, it may also be incorporated into other systems and simply provide a generalized functionality. The asset analyzer 300 may operate on the same single server in certain embodiments; and yet in other embodiments, each function may be distributed among several different servers. The asset analyzer 300 may take input or information from a variety of sources and FIG. 3 only provides a non-limiting example of some of the sources that could be relied upon in various embodiments. The asset analyzer 300 may interface to the information sources via any type of a network connection or be communicatively coupled to a database that is populated by other systems.

One information source may include an automated condition evaluator or ACE 302. The ACE 302 provides a consistent, objective condition assessment for items and removes or diminishes the "human factor" from the evaluation. U.S. Pat. Nos. 7,028,885 and 7,364,075 provide good examples of an ACE 302 and are incorporated into this application by reference. As an example, the ACE 302 may provide information that is obtained with regards to its automated evaluation of the condition of an item. The ACE 302 could include an item evaluation chamber with an array of sensors that conduct various tests and evaluations of an item that is in a controlled environment.

More specifically, an item to be evaluated is first identified. The process of identifying an object may simply include receiving information that identifies the object or, it may include subjecting the item to a preparation process. This process may include, among other things, the washing of the exterior and/or interior of the item to remove debris. In addition, any existing documentation regarding the item is entered into the system. For instance, if the item is a motor vehicle, such documentation could include warranties, previous sales orders, Vehicle Identification Number (VIN), maintenance records, and accident reports. Other items could include other information involving historical information regarding the item, certificates of authenticity, serial numbers, etc.

The information regarding the item is then processed and utilized to create, identify, and/or extract further information about the product. For instance, the VIN can be evaluated to identify particular information about a vehicle, access national databases regarding the history of the vehicle, and obtain manufacturer information regarding the vehicle.

Once the item is identified, either a pre-existing profile that matches the identification of the item is retrieved from a database or over the network or a new profile is created. The profile is created using various techniques including, but not limited to, edge detection, lighting sources, and shading analysis. In addition, known options or configurations of the item are examined and compared to the actual item being evaluated. This can be accomplished by presenting a checklist to a human operator, querying historical databases based on the serial number of the item, or otherwise.

Data acquisition for the item is conducted to determine the condition of the item. The data acquisition is performed using a variety of different types of sensors and sensor inputs that are all evaluated by a central processor. As the data is being acquired, it is analyzed to identify any data abnormalities, glitches, or off-scale data points. If any abnormalities are discovered, the sensors can be reset, repositioned, calibrated, or otherwise adjusted prior to resuming or restarting the data acquisition process. In addition, historical records and databases can be interrogated to identify similar items that had similar abnormalities. Such information can be used to optimize sensor selection and adjustment for the detailed data acquisition activity.

Prior to completing the data acquisition phase, an interrogation of other industry sources can be performed to define any potential problem areas. In addition, the present invention examines its own data depository for the purpose of identifying any potential problem area trends in similar items. Once any potential problem areas have been identified, the data regarding the item is re-evaluated to determine if it is necessary to acquire additional data from the potential problem areas. If it is necessary to re-acquire, the present invention will focus the proper sensor on the potential problem area and re-acquire detailed information.

Once the sensor inputs, abnormalities, and industry-available information have been acquired, the present invention will combine the various sensor inputs, industry trends, historical data, abnormalities, etc., into a condition assessment of the item which can be made available to decision makers. All sensor data will be added to the historical data depository for reference with future similar items.

Advantageously, the ACE 302 provides a consistent, objective, real-time and reliable evaluation regarding the condition of an item. The evaluation can be used in a variety of settings to assist a party that must make a decision regarding the item. In particular, the advantages of the ACE 302 can be incorporated into various embodiments of the GOG and provide data input to the asset analyzer 300.

Another information source may include an intelligent condition evaluator ICE 304. The ICE operates to inspect items and generate an electronic inspection report. One aspect of the ICE is that the system has a repository of completed inspection reports. The system mines the repository to determine correlations between fields of information in the completed inspection reports. Based upon the resulting field correlations, the system checks condition data as the inspector is recording it to determine and/or prevent erroneous data inputs.

Another aspect of the ICE is that it is scalable to inspect items from various industries. Typically, the items from different industries are very unique such that a report template for an item from one industry is not appropriate for an item from another industry. The system is adapted to automatically select the appropriate type of report template and provide the appropriate report template to a data collection device of an inspector or an automated inspector, such as the ACE 302. The system uses various criteria for determining the type of inspection report template to provide to the data collection device. The ICE 304 may also include information obtained from asset reference guides and information from other participating asset disposition venues. Further details regarding various aspects of the ICE can be obtained by examining U.S. Pat. No. 8,739,059, which is incorporated into this application by reference. The information obtained from the ICE 304 can be provided as input to the asset analyzer 300.

Beyond, in addition or in lieu of the information obtained from the ACE 320 and/or the ICE 304 (and similar devices/systems which may be generically referred to as "condition evaluators"), additional information may also be obtained by examining other sources. This additional information may include market value of the asset, market availability, manufacturer information, colocation of supply, price trend analysis based on time, supply versus demand analysis, price impacting events and projected resale information.

The asset analyzer 300 may also receive information with regards to ancillary products/services 306. For instance, if one asset requires or is benefited by another asset, then the asset analyze 300 may consider this fact as a cross-selling point or may link the assets together. As a non-limiting example, if a lot of printers of a specific brand are going to be auctioned and the auction house is aware of a lot of printer cartridges that are compatible with the printers or a service contract (i.e., ancillary services 308) that would cover the printer that is going to be up for bid, then the asset analyzer 300 gathers this information.

With the information gathered with regards to the assets, the asset analyzer 300 may also receive input regarding potential packages 310 that could be formed in a combinatorial auction.

The asset analyzer 300 may also take into consideration any seller requirements 312 that may be available in seller profiles or other information similar to what is available for generating the buyer interest gauge to generate a seller interest gauge. The seller interest gauge can convey a variety of information such as the seller's motivation to move certain product, the willingness of the seller to discount product if it is contingent upon selling of other products, etc. A few non-limiting examples of information that can be seller specific include: wrapper provisioning for legislative needs, audit readiness, security and analytics, as well as other legal requirements that may be associated with the asset; a buyer rating system that identifies the ideal buyer or characteristics of a desired buyer that the seller is looking for; market price of the asset based on the condition of the asset, repair, and refurbishment return-on-investment for improving the assets, conversion or disposal costs of asset, etc.

Thus, it will be appreciated that the full integration of the GOG 200 and the asset analyzer 300 into a framework allows for the creation and maintenance of a data warehouse and business analytics capability that can provide an improved level of business intelligence to the conversion entity, whether it be a consignor, and on-line retailer, a brick and mortar retailer, an auction house, a bidder, a consignor and a trader. Such an integrated system can provide a solution that greatly improves the matching of assets and packages to buyers and helps to drive optimum asset values, or that provides an accurate assessment of the identification of the asset. The accurate identification not only facilitates further analysis to generate the guaranteed offer but, it also improves the ability to find and obtain data on comparable assets.

Thus, one aspect of the asset identification assessment engine is to identify the asset but other aspects focus on identifying the condition of the asset. This information can then be utilized in further actions of the GOG 200.

Baseline Price Assessment Engine

Figure 4:
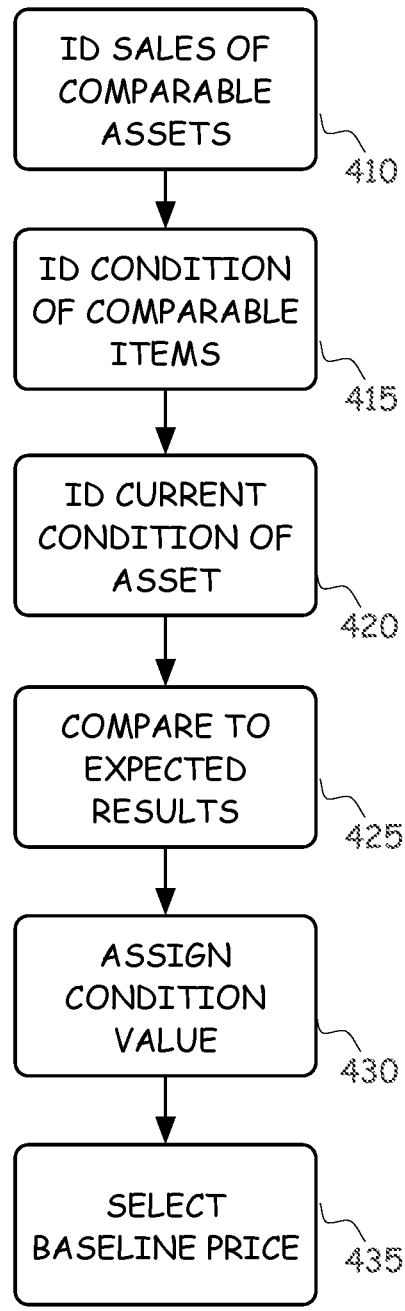
FIG. 4 is a flow diagram illustrating exemplary steps that may represent an exemplary embodiment of the baseline price assessment engine 215.

Once the asset is identified, the baseline price assessment engine 215 can be invoked to derive the baseline price of the asset. The baseline price assessment engine 215 receives the output from the asset identification engine 210 and generates and accurate baseline price for the asset in real-time. Various embodiments may use different techniques to derive the baseline price but a non-limiting example is provided for illustrative purposes. FIG. 4 is a flow diagram illustrating exemplary steps that may represent an exemplary embodiment of the baseline price assessment engine 215. Initially, the baseline price assessment engine 215 identifies sales of comparable items to the target item 410. The output from the asset identification engine 210 may include information to identify comparable items or it may simply provide a database of comparable items already identified. In either case, the baseline price assessment engine 215 needs to identify sales of these items and gather information pertaining to those sales. For instance, the baseline price assessment engine 215 identifies the prices obtained in the identified sales of the comparable items and a condition value of each of the comparable items 415. If the condition value is not known, the baseline price assessment engine 215 can provide what information is available about an item to the asset identification engine 210 and receive condition information in response to the input.

In some embodiments, the asset identification engine 210 may only initially provide the identity of the item to the baseline price assessment engine 215. In such embodiment, the baseline price assessment engine 215 then invokes the asset identification engine 210, or utilizes some other condition evaluator to identify the current condition of the asset under consideration 415. The results of the condition evaluation are then compared to a set of expected results based on the identity of the target item 425. Based on the results of the comparison, the baseline price assessment engine assigns a condition value to the target item 430. At this point, the baseline price assessment engine 215 can then select a baseline price for the target item by comparing the condition value of the target item to prices obtained for comparable items with proximate condition values.

It should be appreciated that the baseline price assessment engine 215 may, in lieu of or in addition to the afore-identified process, consult local, regional and/or national averages to solicit input for establishing the baseline price. KELLY BLUEBOOK is a non-limiting example of such a resource. For instance, if a large number of comparable items exist, the conversion rates obtained for the products can be averaged or the mean taken to establish input for the baseline price.

If the asset is relatively new, the baseline price may simply be the market price for the asset.

Depreciation/Degradation Assessment Engine

The value of an item is constantly changing; and for the most part, it depreciates. However, there are some items, that just like a good wine, appreciate with age.

When generating a guaranteed offer, the depreciation and/or appreciation of an item is brought into consideration. Determining the depreciation for an item can be significantly challenging. As such, the depreciation assessment tool utilized in various embodiments of the invention takes the complexities and mysteries out of the equation and automatically identifies the depreciated value of an item (or appreciated value) and then modifies the baseline price accordingly.

In general, depreciation looks at the cost or value of an asset over its lifespan. Calculating the depreciation on a fixed asset can be accomplished by applying one of several formulas. One such formula is referred to as straight line depreciation.

To calculate depreciation of an item using the straight line depreciation method, one simply needs to identify (a) the purchase price of the item and (b) the scrap or salvage value. The purchase price is simply the value that was exchanged for the item in an acquisition or, the price that is being asked of a purchaser. The salvage value of an item represents how much the item will be worth at the end of its expected life. The estimated salvage value of the asset (salvage value or residual value, as used in automotive) is the amount of money the company expects to recover, less disposal costs, on the date the asset is scrapped, sold, or traded-in.

One additional piece of information required to calculate the depreciation is the expected lifespan of the item or the estimated useful life of the item. Useful life refers to the window of time that a person plans to use an item. To use across all segments, useful life can be expressed in years, months, working hours, etc. In addition, obsolescence may be considered when determining the useful life of an item, as it will likely affect the calculation of depreciation (e.g., a machine capable of producing units for twenty years may be obsolete after six years if the units being made are determined obsolete after six years; therefore, in this scenario, the item's useful life would be six years);

Once the purchase price, salvage value and lifespan are determined, the equation to calculate depreciation is simply:

$$(\text{Purchase price} - \text{Salvage Value}) / \text{Lifespan} = \text{depreciation/year}$$

Another technique is referred to as the double-declining balance depreciation. Using this technique. Those skilled in the art will be aware of how to determine the double-declining balance depreciation but, in general, the process includes first calculating the depreciation rate as follows:

$$\text{Depreciation Rate} = 100\% / \text{Lifespan} * 2$$

Next, for the first year, the annual depreciation is determined as follows:

$$\text{Annual Depreciation} = \text{Purchase Price} * \text{Depreciation Rate}$$

The Depreciated Value of the item is then, after the first year, determined to be:

$$\text{Depreciated Value(year 1)} = \text{Purchase Price} - \text{Annual Depreciation}.$$

For the following years, the process is similar but rather than the purchase price, the calculations are based on the previous years Depreciated Value. Thus, for year "n", the Depreciated Value is calculated as follows:

$$\text{Annual Depreciation(year } n) = \text{Depreciated Value(year } n-1) * \text{Depreciation Rate}$$

$$\text{Depreciated Value(year } n) = \text{Depreciated Value(year } n-1) - \text{Annual Depreciation(year } n)$$

This process is repeated until the Depreciated Value for a year is at or below the Salvage Value.

It will be appreciated that other depreciation techniques may also be used, such as the Sum of Years Depreciation etc. and those skilled in the art will be familiar with these techniques. Each of these techniques could be utilized in various embodiments of the guaranteed offer system.

As described in the non-limiting examples above, depreciation is usually calculated on an annual basis. However, it should be appreciated that such lack of granularity can greatly impede the ability to profitably generate a guaranteed offer that mitigates the offeror's risk. Various embodiments of the guaranteed offer generator may include a depreciation calculator that operates at a much finer granularity. For instance, the depreciation can be calculated monthly, weekly and even daily or hourly. As an example, using straight line depreciation, the daily depreciation can be determined as follows:

$$\text{Daily Depreciation} = (\text{Purchase Price} - \text{Salvage Value}) / (\text{Lifespan} * 365)$$

Thus, if the Purchase Price is $2000 with a Lifespan of 5 years and a Salvage Value 500, the Annual Depreciation would be:

$$\text{Annual Depreciation} = (\$2000 - \$500) / (5) = \$300/\text{year}$$

However, the Daily Depreciation would be:

$$\text{Daily Depreciation} = (\$2000 - \$500) / (5 * 365) = \$0.82/\text{day}$$

It will be greatly appreciated that increasing the granularity of the depreciation can thus have a considerable impact on how depreciation affects the baseline price when generating a guaranteed offer. This technique can be applied to any of the depreciation models to provide a higher level of granularity.

Once the depreciation value is identified, the baseline price of the item can be reduced accordingly. Advantageously, as the item sits on the shelf, or in the show room, or an auction floor, etc., the guaranteed offer can be adjusted commensurate with the depreciation of the item.

In other embodiments, rather than formulaically calculating the depreciation, the depreciation value can be identified by comparing the item to comparable items and looking at the selling price for those items. Items with comparable conditions and age to the target item can be analyzed in making this determination.

Other factors may also be considered in determining the depreciation of an asset. One such factor involves the effect of legal provisions or statutes that may be or have been enacted. An example of this can be seen in looking at patent assets. Alice Corp. v. CLS Bank International, 573 U.S. 208, 134 S. Ct. 2347 (2014), was a 2014 decision of the United States Supreme Court about patent eligibility. The issue in the case was whether certain claims about a computer-implemented, electronic escrow service for facilitating financial transactions was merely an abstract idea, and thus ineligible for patent protection. The patents were held to be invalid as the Court construed that the claims were drawn to an abstract idea, and implementing those claims on a computer was not enough to transform that idea into patentable subject matter.

Although the Alice opinion did not mention software as such, the case was widely considered as a decision on software patents or patents on software for business methods. It and the 2010 Supreme Court decision in Bilski v. Kappos, another case involving software for a business method (which also did not opine on software as such), were the first Supreme Court cases on the patent eligibility of software-related inventions since Diamond v. Diehr in 1981.

In response to the Alice decision, the United States Patent Office completely turned the patent prosecution world upside down, making it extremely difficult to get a patent to issue on anything was implemented in software. Further, infringers began challenging asserted patents by requesting reexaminations in view of the Alice decision. All of this greatly reduced the ability to sale patent assets and value that could be obtained for patent assets. However, in 2019 the United States Patent Office introduced a new guideline for the examination of patents that may have a significant impact on rolling back the effect of the Alice decision.

Other examples may include regulations that may be imposed on the use of a product. This is especially true for State level regulations in that while one State may be quite lenient on the use of a particular asset, another State may be highly regulated. For example, chicken coups in Alabama are subject to a much different set of regulations than those in California.

As such, in some embodiments, the depreciation assessment engine 220 may identify statutes, legislation, regulations, etc. ("laws") that may impose restrictions on the use of an asset. Once the laws are identified, an analysis is performed to determine if the laws are regionally based, nationwide based or even global. The depreciation assessment engine 220 identifies the potential market for the asset. In an auctioning environment, the depreciation assessment engine 220 can identify the audience in real time and determine if, and how many, of the potential audience participants fall within a zone that has laws restricting the use of the asset. Similarly, in an online consignment or straight sale, the audience demographics can also be ascertained. As such, the depreciation of the asset can take this into consideration. As a non-limiting example, if 50% of the audience is from a State that imposes an $X/year assessment against an entity for operating the asset within the State, then the depreciation value of the asset can be reduced. For instance, the depreciation value can include the $X per year multiplied by 50% as the probability that the sell will occur to someone from the highly regulated State. In another technique, the entire $X can be applied towards the depreciation value to focus on worst case scenarios.

It will also be appreciated that in some situations, there is no residual value. For instance, if a product expires at a certain date, the residual value may be reduced to zero. Examples of assets that expire may include patents, sperm bull, blood, fuel, etc. Thus, the useful life of such assets is also the fixed live span of the asset.

Further, depreciation of an asset can be accelerated or retarded based on a variety of situations. Ancillary effects on the value of an asset can occur based on storing of an asset in a favorable or an unfavorable environment, the manner in which the asset is utilized (i.e. large number of hours of operation for motorized equipment), risks that are realized when transporting the asset (i.e., transporting of cows to market faces the risk of weight loss and sickness, etc., transporting automobiles through an industrial area when rain is predicted—exposing the automobiles to acid rain damage).

In other embodiments a combination of one or more depreciation models and the comparable item comparison can be combined to derive at a depreciation value. For example, the depreciation can be calculated using one of the above-described techniques, or another technique. In addition, the selling prices for a domain of comparable items can be averaged, or the mean can be taken, and then again averaged with the calculated depreciation to identify the depreciation value.

Conversion Probability Value

One of the main risks that the entity providing the guaranteed offer faces is the target item not being converted. As such, it is of great benefit to know, or have an accurate assessment on the probability of a conversion occurring. Once the probability of conversion is identified, this can be translated into a probability of conversion value and then used to adjust the guaranteed offer. Those skilled in the art will appreciate that this capability, which may be incorporated into any of the various embodiments, can be calculated and applied in a variety of manners. As such, the general inventive concept is simply utilizing a mechanism to identify the probability of conversion and then using the knowledge to adjust the guaranteed offer. However, a non-limiting example provides one potential embodiment for this aspect of the guaranteed offer system.

Leveraging the knowledge base of the underlying system, as well as publicly available information, and the identification of the target item, other sales or attempted sales for similar or comparable products can be identified. It should be appreciated that comparable products may be identical items, substitute items or even items that have comparable correlations. For instance, if the target item is a 2009 Les Paul Standard electric guitar, comparable items may include other 2009 Les Paul electric guitars, or Les Paul electric guitars built between 2007 and 2011. In some instances, one may expand the domain of comparable items to include electric guitars. However, such an expansion has to be done carefully because, a certain brand/model of a product may have significantly different depreciation or degradation characteristics than another. For instance, to very famous brands of electric guitars are the Gibson Les Paul and the Fender Stratocaster. Among musicians, you may tend to find quite a bit of consumer polarization with regards to these two brands. This is similar to the pick-up truck market where you will often hear someone proudly declare "I am a Ford man" while some other misguided soul may declare "I am a Ram man" or "I am a Chevy man". And while those with an affinity towards one or the other may be quite polarized, in general, the value depreciation for the different items may in fact be quite similar. Thus, it is important that the depreciation numbers are examined when selecting comparable items for the conversion probability as the market performance for these products may prove to be quite comparable or quite differentiated.

Once a category of comparable items is identified, attempted sales or offerings of a domain of comparable items can be examined. In this process, the offer price that each of the comparable items in the domain of comparable items should be identified and the depreciated and/or degraded value of the comparable items needs to be determined. Each of the transactions associated with the comparable items can be classified as sales or no-sales. For the sales, the actual sales price achieved for the comparable items should also be identified.

For each of the sales of comparable items, one of the following scenarios will apply:

Offer Price≥Depreciated Value≥Sales Price
Offer Price≥Sales Price≥Depreciated Value
Sales Price≥Offer Price≥Depreciated Value
Sales Price≥Depreciated Value≥Offer Price
Depreciated Value≥Offer Price≥Sales Price
Depreciated Value≥Sales Price≥Offer Price Over the domain of sales attempts, a probability of success, or conversion, can be attributed to each of these scenarios based on the actual occurrences. For instance, suppose that a domain consists of 5000 offers. The number of appearances of each of the above listed scenarios is determined to be as presented in the following table:

TABLE-1

| Scenario | # in domain | # converted | Probability |
|---|---|---|---|
| Offer Price ≥ Depreciated Value ≥ Sales Price | 1426 | 1257 | 88% |
| Offer Price ≥ Sales Price ≥ Depreciated Value | 1897 | 1654 | 87% |
| Sales Price ≥ Offer Price ≥ Depreciated Value | 470 | 320 | 68% |
| Sales Price ≥ Depreciated Value ≥ Offer Price | 664 | 356 | 53.6% |
| Depreciated Value ≥ Offer Price ≥ Sales Price | 286 | 112 | 39.2% |
| Depreciated Value ≥ Sales Price ≥ Offer Price | 257 | 203 | 79% |
| Totals | 5000 | 3902 | 78% |

Ignoring the actual sales price, the target items can be analyzed in view of the probabilities listed in Table 1. For instance, if the depreciation for the target item is determined, the offer price can be set to be greater than the depreciated value. In the presented example, this would result in an expected probability of conversion as being one of the top three scenarios, and thus, the probability of conversion would be (1257+1654+320)/(1426+1897+470)*100 or 85%.

However, it will be appreciated that the difference between the Offer Price, Depreciated Value and Sales Price may also have a significant impact. For instance, if the Offer Price is ten times the Depreciated Value, the probability of conversion is anticipated to be less than if the Offer Price is only 1.1 times the Depreciated value. As a non-limiting example, TABLE-2 breaks down the Offer Price Depreciated Value Sales Price scenario based on a percentage of the Offer Price and Depreciated Value deltas. The first column lists the offer price OP and depreciated value DV difference or delta. For instance, an OP-DV of 1.1 means that the offer price is 1.1 times the depreciated value of the comparable item. Then the OP-DV delta that applies to each of the offers within the Offer Price≥Depreciated Value≥Sales Price is identified. From here, the percentage of conversion can be calculated.

TABLE-2

| OP-DV Delta | # Offers | # Sales | Percentage |
|---|---|---|---|
| 1 | 17 | 16 | 94% |
| 1.1 | 29 | 29 | 100% |
| 1.2 | 148 | 148 | 100% |
| 1.3 | 1003 | 887 | 88% |
| 1.4 | 206 | 175 | 85% |
| 1.5 | 3 | 1 | 33% |
| 1.6 | 6 | 0 | 0% |
| 1.7 | 5 | 0 | 0% |
| 1.8 | 5 | 0 | 0% |
| 1.9 | 3 | 1 | 33% |
| 2 | 1 | 0 | 0% |
|  | 1426 | 1257 |  |

A normalization algorithm can be utilized to identify the conversion probability for the target item. As presented in TABLE-2, the algorithm can first group the comparable items based on the value of the difference between the offering price and the depreciated value of each comparable device. Here the range runs from 1 to 2 in increments of 0.1. Next, the algorithm operates to identify the number of offers and the number of sales within each grouping. At this point, the percentage of conversions for each group can be calculated. Finally, groupings that have a percentage that exceed a minimum threshold can be selected.

CHART-1

Figure 8:
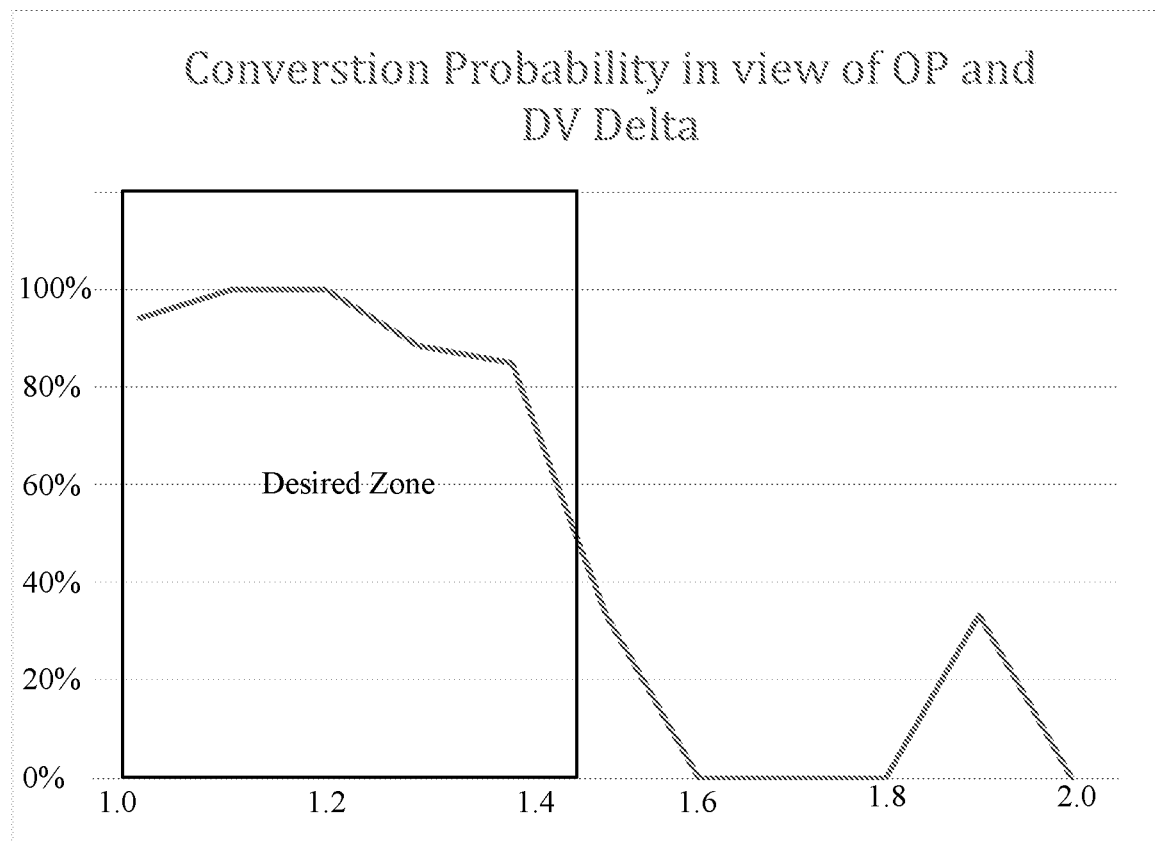
FIG. 8 is a graph showing conversion probability in view of OP and DV Deltas.

From examining TABLE-2 and the chart presented in FIG. 8 for the Offer Price≥Depreciated Value≥Sales Price scenario, the desired zone for the offer price is within 1 to 1.4 times the depreciation value. This process can be repeated for each of the scenarios that were identified as desirable scenarios.

Finally, the sales price, while not affecting the probability of conversion, must be considered as a component of the equation since it has an effect on the desirability of the outcome. For instance, if the sales price is considerably below the offer price and depreciated value, the risk for the guaranteed offeror can be significantly increased in that it will likely impact the cost differential that the guaranteed offeror will have to supplement at the conclusion of the sale.

In the three categories identified as most applicable in the current example, Offer Price≥Depreciated Value≥Sales Price, Offer Price≥Sales Price≥Depreciated Value, and Sales Price≥Offer Price≥Depreciated Value, the Sales Price is larger than the Offer Price in one scenario, and less than the Offer Price in the other two scenarios. For each of the offers in domain being examined, the difference between the Offered Price and Sales Price should either devalue or enhance the value of the assigned probability. For instance, if the Sales Price is greater than the Offer Price, then this would indicate that the identified conversion probability is highly reliable and repeatable. However, if the Sales Price is significantly below the Offer Price, then the conversion probability may be inflated and create a false security for the guaranteed offeror. As such, a weight should be associated with each of the offers based on the Offer Price and Sales Price delta (OP-SP Delta). This could be accomplished in a variety of manners. One manner would be to assign a weight of 1 to any offers in which the OP-SP Delta is within plus or minus 10% of the OP. A weight of 2 can be assigned is the OP-SP is at least 20% above and a weight of 0.5 if the OP-SP is at least 20% below. Further, a weight of 4 could be applied if the OP-SP delta is at least a 30% above and a weight of 0.25 if the OP-SP delta is at least 30% below. TABLE-3 provides a non-limiting example of a weight assignment.

TABLE-3

| OP-SP Delta | Weight |
|---|---|
| +50% | 16 |
| +40% | 8 |
| +30% | 4 |
| +20% | 2 |
| +/-10% | 1 |
| -20% | 5 |
| -30% | .25 |

TABLE-3-continued

| OP-SP Delta | Weight |
|---|---|
| −40% | .125 |
| −50% | .0625 |

It should be appreciated that other weighting schemas could be applied based on the Sales Price, as well as based on other factors such as, the amount of time the offer was outstanding, in an auction scenario the number of bids and the fervency of the bidding activity, etc. could be used to identify and assign a weight. Whatever technique utilized, the weighted values can then be applied when recalculating the conversion percentages in TABLE-2. For instance, rather than looking at the actual number of conversions, for each OP-DV delta, the OP-SP delta could be used to sub-group the offers, calculate the conversion probability for the sub-groupings based on the OP-SP delta weighting, and then average the conversion probabilities together. As a non-limiting example, focusing on the OP-DV delta of 1.2 in TABLE-2, the entries are as follows:

| OP-DV Delta | # Offers | # Sales | Percentage |
|---|---|---|---|
| 1.2 | 148 | 148 | 100% |

If, for the purposes of example, assume that 1 of these sales has an OP-SP delta of +20%, 142 are within the +/−10% range, 1 is in the −20% range, 3 in the −30% range and 1 in the −40% range, rather than a conversion probability of 100%, the conversion probability would be calculated as follows:

| OP-SP Delta | # Offers | # Sales | Weight | Weighted Percentage | Expanded Percentage |
|---|---|---|---|---|---|
| +20% | 1 | 1 | 2 | 200% | 200% |
| +/−10% | 142 | 142 | 1 | 100% | 14200% |
| −20% | 1 | 1 | .5 | 50% | 50% |
| −30% | 3 | 3 | .25 | 25% | 75% |
| −40% | 1 | 1 | .125 | 12.5% | 12.5% |
| Totals | | 148 | | | 14537.5% |
| Normalized | | | | | 98.22% |

Thus, the non-limiting example illustrates how a conversion probability can be calculated taking into account the offering price, the depreciated value and the sales price. The conversion probability can then be used to adjust the baseline price. A variety of techniques can be used to make this adjustment and, within particular scenarios, the results can be monitored and analyzed such that the application of the conversion probability to the baseline price can be augmented to achieve better results. As a non-limiting example, the baseline price can be adjusted directly proportional to the conversion probability. For instance, in the above-provided example, the conversion probability is 98.22%. The baseline price can then be multiplied by 98.22% to obtain an adjusted baseline price. If the baseline price is $1500, then the adjusted baseline price from the above-listed example would be 1500*0.9822=$1473.3. In some embodiments, rather than simply a linear application of the conversion probability, the effect of the conversion probability can be slightly squelched by reducing the impact to be only half or 50% of the straight line effect. For instance, the baseline price of $1500 could be reduced by ½*(1−Expanded Percentage) or $1500−($1500*½*(1−0.9822)=$1,486.65. In other embodiments, a logarithmic equation or exponential equation could be utilized to flatten the adjustment at the higher ends.

Demographics Assessment Engine

The demographics assessment engine 230 generates a value adjustment for the baseline price based on a variety of factors. As non-limiting examples, the demographics may include the makeup of the target audience, the interests of the audience, other products or services that can be combined with the asset in a combinatorial fashion, the manner in which an audience member values a product, etc.

As a non-limiting example, the results of a condition evaluation can be compared to better understand the value of an asset in other segments (e.g., the value of a ten-year-old car may be assigned a guaranteed offer in the whole-car industry but a different guaranteed offer in the crash-car industry by the parts industry). Further, the results of the condition evaluation can be compared to understand its value in the same or other segments by packaging alternate offerings via combinatorial (or multi-dimensional) practices (e.g., selling cows with a farm sale). It will be appreciated then that one can customize products and prices for different customer segments.

It should also be understood that a product will often have a much higher perceived value for an "ideal" customer than it will for an average prospect. If this is the case, the markets or segments can be separated and then a different guaranteed price can be generated for each market or segment. Further, a product may have a higher perceived value for an entity that is a heavy user. Thus, an entity that is a heavy user of a product has a greater need for the product and thus, will attribute a higher value than a light user that would just periodically require use of the asset. Heavy users also may be more interested in added features or complementary products and as such, ancillary products can be utilized as a mechanism for differential pricing. When customers use a product differently from other customers, it can result in creating a difference in the perceived value of the product. Thus, a product's different applications often have different perceived value.

In an exemplary embodiment, the demographics assessment of the target item may thus include identifying the audience that is available for the conversion event. In an online auction, consignment or retail environment, this simply involves identifying the parties that are actively participating. In off-line scenarios, this may similarly be accomplished by identifying the parties registered to be at the event, obtaining real-time information as parties check in at the event location, and even using surveillance techniques such as cameras with facial recognition, license plate recognition of vehicles, etc.

Once the audience is identified, the audience members can be analyzed to identify an interest level. As presented above, the make-up of the audience can greatly impact the perceived value of an asset and hence the interest level.

Finally, the demographics value can be set to a value commensurate with the interest level. This can be accomplished in a variety of manners, and while non-limiting examples may be provided herein, it should be appreciated that the inventive concept of analyzing the demographics and converting this analysis into a value for adjusting the baseline price of a guaranteed offer is the general concept being protected.

As an example, the interest level can be presented on a scale of 0 to 100 with 0 indicating no interest in the audience and 100 indicating that all members of the audience have an extremely high interest and will most likely take action to purchase the asset.

As an example, suppose the conversion event is an auction for automobiles that have been damaged from a severe hurricane. Portions of the available inventory are damaged but each of the inventory items has salvage value for parts. About 60% of the inventory are classified as repairable at a cost of less than $1000, 10% is reparable for a cost of $2000 and 20% of the inventory is classified as non-repairable. The audience is made up of 25% purchases for leasing companies, 25% of the audience is used sellers and 50% of the audience are part sellers.

Given this scenario, the demographic value could be determined as follows:

| | Audience Interest based on Product Condition | | |
|---|---|---|---|
| Audience | $1000 cost (60%) | $2000 cost (10%) | non-repairable (20%) |
| 25% leasers | 80% | 40% | 0% |
| 25% used sellers | 100% | 80% | 0% |
| 50% parts | 100% | 100% | 100% |
| Averages | 93% | 73% | 33% |

Here, the average interests in 60% of the inventory is 93%, and 10% of the inventor is 73% and 20% of the inventory is 33%. This can further be processed to find the average interest in the entire inventory as follows:

Demographics Value=(93*60+73*10+33*20)/ 100=70%

Thus, in this example the Demographics Value of 70% could be applied against the baseline price by multiplying the Demographics Value by the baseline price. It should be appreciated that this could drastically lower the baseline price and so, a normalization algorithm can be applied. As a non-limiting example, the maximum impact of the Demographics Value could be set to 10% of the baseline price. In the provided example, the Demographics Value of 70% could be applied to this 10% maximum value and thus, the 70% Demographics Value would result in a 7% decrease in the baseline price.

As another example, the demographics may analyze two or more buyer audiences as presented in the above-provided example. Thus, audience A may have a Demographic Value of 70%, audience B may have a Demographic Value of 40% and audience C may have a Demographic Value of 90%. The GOG may generate a guaranteed offer for each of these three scenarios. Thus, if the asset is presented at conversion events in the order of audience A, audience B and then audience C, the different guaranteed offers will kick in as the asset is moved between the audiences.

Buyer Interest Gauge—Assessment and Evaluation of the Needs of the Participants

One tool to quantify the above-listed demographics is to utilize a buyer interest gauge generator to gather, review analyze and synthesize information to generate a buyer interest gauge. The buyer interest gauge can incorporate a wide array of information; but it will be appreciated that the more information that can be gathered, synthesized, analyzed, categorized, indexed and processed, the stronger, more reliable and more accurate the buyer interest gauge will be. The quality of the buyer interest gauge is impacted by the ability to fully integrate as many elements as possible that could impact the value and/or strategic nature of the transaction. The Buyer Interest Gauge (BIG) can be used by the demographics assessment engine it deriving a value for adjusting the baseline price.

Figure 5:
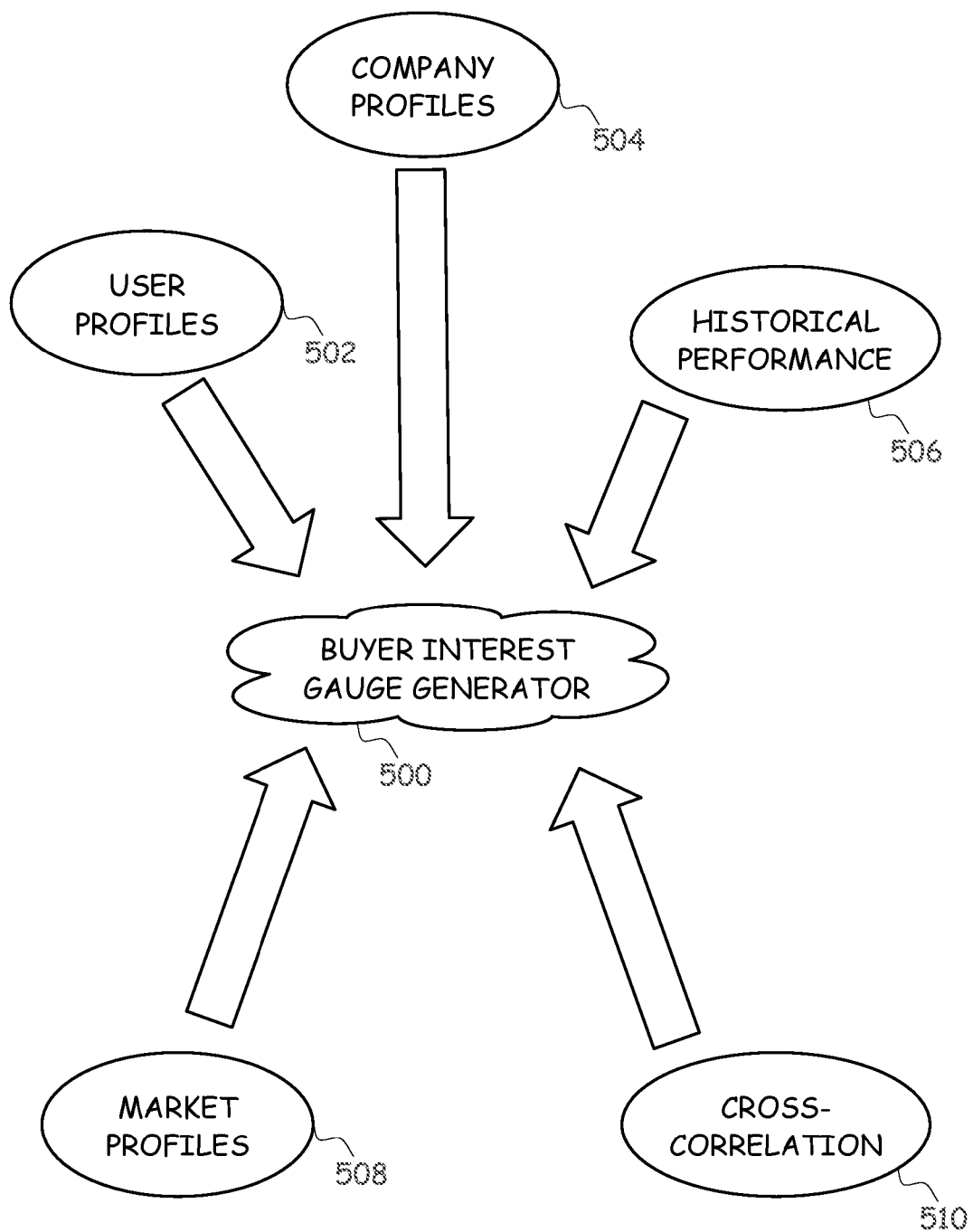
FIG. 5 is a functional block diagram illustrating an exemplary information integration that could be utilized for generating the buyer interest gauge.

FIG. 5 is a functional block diagram illustrating an exemplary information integration that could be utilized for generating the buyer interest gauge. A buyer interest gauge generator (BIGG) 500 operates as a central depository and brain center for soliciting, scraping, searching, requesting and otherwise obtaining information that can be used to create the buyer interest gauge. In the illustrated embodiment, the non-limiting examples of sources of information include user profiles 502, company profiles 504, historical performance 506, market profiles 508, and cross-correlation 510.

The user or buyer profiles 502 may include information that the user has provided by completing a questionnaire or online form that identifies particular wants, cost ranges, expected expenditures, budgets, etc. It will be appreciated that the amount and types of information provided in the user profiles 502 is basically limitless. The user could provide specifics regarding items that are being sought, generalities regarding desired items, categories or features that are or are not desired, amount of inventory that the user can absorb, the ability of the user to transport inventory, etc. The user profile 502 may reflect standard information such as business type, items sought, etc., market-specific asset needs, notification or alert preferences, etc. The user profiles 502 may also provide an indication of the finance approval ratings and cash-on-hand information about the user. The user profiles 502 may include or be augmented by mined user activity records, such as cookies, search histories or other items that can be read from the buyer's computer, or information gathered by watching the user's activity on the computer.

Similarly, the company profiles may include a wide variety of information. In some cases, the user profile 502 and the company profile 504 information may be one in the same; but in other embodiments, the company profiles 504 may be utilized to provide company specific information, such as number of customers, work-in-progress, current inventories, location of customers, particular needs of customers, etc. It will be appreciated that the user profiles 502 and the company profiles 504 may be provided by the user and/or company to a conversion entity (see element 730 of FIG. 7), such as an auction house, on-line retailer of consignor, etc., or may be obtained by the same from other similar entities other sources (see element 730 of FIG. 7). The buyer interest gauge generator may scrape information from a user's or a company's website, earnings reports, etc. (see element 725 of FIG. 7)

The historical performance 506 may include data that has been accumulated by the conversion entity as well as other conversion entities, including online and off-line activities of the user and/or company. This information can be utilized to assess the types of purchases the user has been interested in in the past, the volumes of product, bidding habits, products, features, etc.

The market profiles 508 may include data pertinent to the particular market or business that the user or company is operating within. For instance, the user profiles and/or company profiles may be utilized to identify the particular market in which the user and/or company operate as well as characteristics of that market. The Buyer Interest Gauge Generator 500 can then pull information from other sources that provide market specific data that can help to characterize the buyer interest—for instance, product trending information, recall information, consumer report information, consumer interest index ratings, resale values, etc. The market profiles 508 may also take into consideration market-unique elements that could impact the value of an asset. For instance, by examining market information, the BIGG 500 can determine that a new product release may render an older version of the product obsolete and greatly diminish the price. As another non-limiting example, knowledge of a future price increase may increase current interest in the product that is on hand.

Cross-correlations 510 may also be performed by examining user and/or company profiles of similarly situated parties as well as comparison with the domain of products and services that are visible to the conversion entity. This information may be utilized to match up with user and/or company interest by utilizing information to augment certain products that may not appear attractive to a particular user and/or company but, when bundled or augmented, can become quite suitable to the user's needs. The cross-correlation 510 may also include accessing financial entities and, based on particular information known about the user or company, determine the risk associated with a particular user and/or company in actually taking delivery of items of interest and the quantities and expenditures that the user and/or company are estimated as being able to afford. The cross-correlations 510 may also look at the user/companies transportation capabilities as well as transportation resources known to the auction house that have capacity to move in the direction or vicinity of the user. The cross-correlations 510 may also take into consideration other participants in the auction and their needs and buying habits.

All of this information, as well as additional information, can be brought into the Buyer Interest Gauge Generator to generate a multi-faceted interest gauge that can be visually or electronically utilized to generate actions or suggestions on who and how to approach with regards to items and packages that are being offered for auction.

The Buyer Interest Gauge Generator (BIGG) 500 can be viewed as a data depository with adaptive and analytical capabilities. The BIGG 500 can be a static type machine that generates an interest gauge only periodically, such as at the beginning of a conversion event; but preferably, the BIGG 500 is extremely dynamic with capabilities of providing feedback and updated interest gauges of relevant, up-to-the-second information in sub-second timing. For instance, as product is moving through an auction house or on-line retailer, the buyer interest gauges may be modified significantly due to product movement, availability, recent purchases, etc.

It should be appreciated that the BIGG 500 may access any and all relevant data sources, including local data sources, cloud sources, industry sources, corporate warehouses, social media streams, etc. The BIGG 500 assimilates and processes all relevant data of different types including unstructured, semi-structured, structured, spatial data, raw data, etc. The BIGG 500 not only obtains the data through various means but also integrates and cleanses the data in preparing the data for analysis, indexing and searching.

In calculating the value of the BIG various techniques may be used. As a non-limiting example, each of the 5 listed segments, user profiles 502, company profiles 504, historical performance 506, market profiles 508 and cross-correlation 510 may be attributed a certain number of potential points. As the data in each segment is analyzed, the number of points may be decremented to a minimum value or incremented to a maximum value. Once completed, the values in each segment can be summed to create Demographics Value.

As a more specific example, suppose the points for each segment are assigned as follows:

| BIGG Segment | Max Points | Final Points |
|---|---|---|
| User Profile | 30 | 28 |
| Company Profile | 10 | 6 |
| Hist. Performance | 20 | 15 |
| Market Profiles | 35 | 32 |
| Cross-Correlation | 5 | 5 |
| Totals | | 86 |

In the provided example, the Demographics Value is thus 86. Similar to the example above, this may be represented as 86% and then be used to adjust the value of the baseline price.

Application of the Buyer Interest Gauge

It will be appreciated that the buyer interest gauge then gives a tool for a buyer and/or seller to identify the value that a particular item, service, or group of items and/or services may bring to a particular buyer, group of buyers, class of buyers, etc., as well as to identify the value of buying entities on the audience of a conversion event. By coupling the information obtained about the buyer with the condition information obtained from a condition evaluator or other sources of the item and/or service and then applying mathematical, heuristic, psychological and other rules and manipulations to the information, a buyer interest gauge can be determined that accurately reflects the value of the item and/or service to the buyer. This buyer interest gauge can then be used in a variety of manners. For instance, when a buyer turns on or accesses an online conversion system, the buyer can be alerted that there are X items coming up in one or more sales that, based on the buyer interest gauge for that buyer, may be of particular interest. The buyer interest gauge may be used to message or notify the buyer in a variety of manners, including the sending of emails, texts, alerts, telephone calls, postcards, etc., to inform a buyer or identify to a buyer certain products and/or services that may be of particular interest to the buyer based at least in part on the buyer interest gauge.

It should be appreciated that the buyer interest gauge is not merely the attachment of a number or indicator to an item to show the value, desirability, or quality of the item, but rather it is a combination of the information obtained about the buyer as previously described in view of an assessment of the condition and characteristics of the item and/or service, as well as packages thereof. The buyer interest gauge is a dynamic measurement that can change completely independent from changes in the condition of the item, the user profile information, etc.

As an example, the buyer interest gauge may be updated based on actions that recently occurred during a conversion event. For instance, in an auction environment, the buyer interest gauge may indicate that the buyer should have a high interest in a certain group of products at the onset of the auction. However, based on the bidding actions of the buyer and items acquired during the auction, the buyer interest gauge for that buyer may be updated. As a result, the updated buyer interest gauge may indicate that the buyer would have little to no interest in that certain group of products. Thus, the buyer interest gauge is dynamic.

As another example, the buyer interest gauge may be updated completely independent from activities of the buyer and/or the condition of the items. For instance, if a hurricane or other force causes collateral damage, this could have an effect on the buyer interest gauge for various buyers. More specifically, if a buyer is an auto parts dealer and a hurricane invokes significant damage to a large number of vehicles, the buyer interest gauge may be affected, reflecting that a significant source of product may be available to such a buyer. In addition, if another buyer is a used car dealer, such an event may result in limiting the supply of product for the buyer and as such, the buyer interest gauge may reflect a higher interest for product currently available, knowing that a limited supply is around the corner. Thus, the buyer interest gauge is not only dynamic but also can change independently from the buyer and the item in some circumstances.

As previously mentioned, the buyer interest gauge can be used for identifying combinatorial options for a conversion event; for instance, items and/or services can be packaged together and the packages will run through the BIGG to generate the buyer interest gauge. The buyer interest gauge for such packages can be used as a determining factor as to whether or not the package should be offered up in a combinatorial conversion event. If it is determined that for a large number of potential buyers the average buyer interest gauge is high, then the conversion entity (seller or auction house) may conclude that the package should be offered. However, if only a small number of potential buyers have a significant buyer interest gauge in the package, then the bidding for the package may be diminished and thus, of no interest to the seller(s) or auction house.

Figure 6:
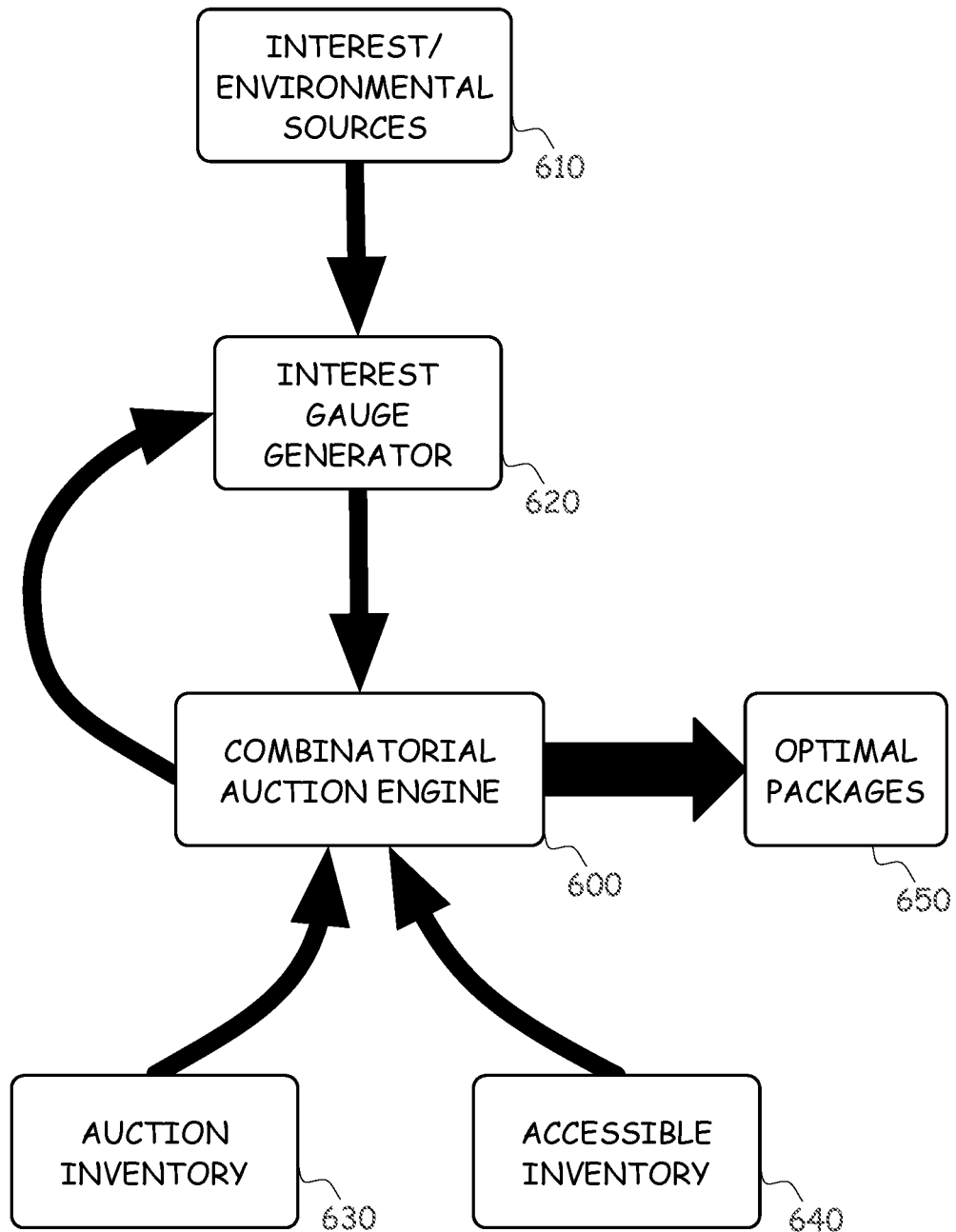
FIG. 6 is a block diagram illustrating an exemplary embodiment of a combinatorial auction engine that operates to control the input to and the operation and flow of an auction.

FIG. 6 is a block diagram illustrating an exemplary embodiment of a combinatorial auction engine that operates to control the input to and the operation and flow of an auction. The combinatorial auction engine 600 is shown as receiving input from at least two types of sources, interest/environmental sources and inventory sources. The interest gauge is generated based on a wide variety of information and the sources, weight and types of information can change from one embodiment to the other. In the illustrated general embodiment, the information obtained from the interest/environmental sources 610 is fed into the interest gauge generator (IGG) 620 to generate a variety of interest gauges (i.e., buyer interest gauge, seller interest gauge, auction house interest gauge, third party service provider interest gauge, etc.) for multiple users and/or classes of users and/or groupings of users etc. The combinatorial auction engine also receives inventory input for the current auction 630, as well as accessible inventory 640 that can be acquired, obtained, consigned, or otherwise utilized by the auction house and/or seller. Armed with this information as well as other potential information, the combinatorial auction engine can run through various permutations to identify packages that have optimum interest ratings or that will achieve optimum or desired results. As a non-limiting example, the combinatorial auction engine 600 may take a list of the auction inventory 630 and selected items from the accessible inventory 640 and generate permutations for packages. The permutations may be a brute force effort that covers all permutations of the available items or they may be intelligently assembled based on a variety of rules that can be customized per auction house, per buyer list, or by any of a variety of other factors. Thus, combinations such as toilet stools and knitting needles could be eliminated, if so desired. The various combinations can then be fed back through the IGG 620 to be combined with the information obtained from the interest/environmental sources 610 and generate interest gauges for each such combination across a wide range of buyers. The combinatorial auction engine can then apply heuristics to determine which packages should be offered to the auctioning public based at least in part on the interest gauges. For instance, having access to the totality of information, the IGG 620 may include logic that determines the optimal approach to take in an auction based on segments of the information or all of the information. Thus, although the IGG 620 is shown as generating optimal packages 650, the IGG 620 also may generate control information to identify actions such as the order in which items are to be offered, the starting bids, the bid increments, other psychological tactics to be applied, as well as looking at the totality of the circumstances in determining what and how to offer optimal packages. This can result in a highly dynamic auctioning environment that not only can be modified and tweaked to be optimal at a given point in time but that can be dynamically altered as the auction progresses. The IGG 520 can consider factors such as the demographics of the auction audience, current rates for particular items (i.e., fuel prices, scrap metal prices, etc.), other avenues or options for selling items, other options for potential acquirers for flipping items or portions of items acquired, etc. Thus, based on the variety of information provided into the system, items may be packaged, split, and/or re-ordered in the auction and otherwise offered differently to focus on particular goals or demands present at the current time. The particular presentment, combinations, etc., can be determined by looking at the whole picture and making judgments for the operation of the auction based on the particular goals or requirements. For instance, profitability requirements at a particular auction may be relaxed in the interest of moving inventory as a non-limiting example.

In addition, the buyer interest gauge can be utilized for reverse combinatorial auctions or splits. For example, if an auction has an inventory of used cars to be moved but the auction participants are primarily body parts and restoration companies, the combinatorial auction engine may also look for ways to split up the items in the inventory to maximize profit and/or moved items. For instance, for each of the non-usable, "totaled" automobiles, the engine, the glass, the panels, etc., could be auctioned separately. Thus, for each item that rolls into the lane, multiple auctions may take place either simultaneously or back-to-back. In addition, the combinatorial auction engine may produce packages that are a combination of splits and packages. For instance, all of the engines in one particular model may be packaged together, all of the engines may be packaged together, or engines may be packaged with certain tools. Thus, it will be appreciated that the combinatorial auction engine could be adapted to work in any of these scenarios.

Further, it should be appreciated that similar to the buyer interest gauge, a seller interest gauge may also be generated and utilized in various embodiments. The seller interest gauge may be an indication of a seller's motivation to sell or move a product. Such information could be useful for buyers in determining which items they should bid on and for auction houses in determining how best to move the product and package the product with other items. Thus, the seller interest gauge may include seller profile information such as the price being sought, the current inventory, the identification of other items the seller is looking to purchase and other items the seller is looking to sell, the aging of the product, the condition of the product, etc.

Thus, it will be appreciated that the buyer interest gauge, or in some embodiments simply an interest gauge, advantageously benefits all parties in an auctioning environment, allowing buyers to better know what to target, allowing auction houses and sellers to understand how to augment the auction by splits and combinatorial offerings, how to push the product, how to control the psychology of the auction, etc.

One advantage incorporated into the various embodiments is the integration of informational sources tailored to user-specific needs. This allows transactional values to be calculated, thereby eliminating decision illusion. For instance, bidders can be provided with access to a myriad of valuable data points, including but not limited to the following:

Asset condition information—based on the needs of the segment—and the specific value to the potential user based on same;
Assistance in determining market prices for items of interest involving expert search components;
Locations of needed supply;
Price trend analysis by time period;
Supply-versus-demand analysis by time period;
Projected resale information (price, time, cost, etc.) from retail versus wholesale demand, price, etc.;
Alerts to "events" which may or tend to impact price and supply/demand;
After-transaction services, including projected costs, vendor profiles, vendor satisfaction index ratings, service ratings, etc., associated with such activities as shipping/transportation, financing, insurance, repair, and post-auction inspection information;
Notification/coordination with vendors for services; and
Automated self-policing information (e.g., credit limits; institutional requests, etc.).

In addition, the sellers (e.g., consignors, etc.) and middlemen (e.g., auction houses, wholesalers, etc.) may also be provided with access to a myriad of valuable data points, including but not limited to the following:

Status of the auction/sale with cradle-to-grave tracking of the asset during the disposition cycle;
Assistance in establishing market prices for assigned items with respect to:
Supply versus demand trends (30, 60, 90, 180, and 365 days);
Disposition venue trends;
Price differentials associated with the grouping of items ("smart" reserve pricing per item and real-time modification);
Effects of external events on supply, demand, and price; and
Trends on value with bundled services;
"Want" and "need" list for push/pull marketing;
Detailed asset information, including:
Features/functions;
Condition reports;
Determination of asset's value to the potential buying pool based on condition;
Configuration of catalog placement optimization or cross-venue offering;
Integration into the seller's and middleman's (e.g., auction house, etc.) content management strategy;
Customer "want" and "need" list for push/pull marketing;
Configuration of catalog placement optimization;
Trend identification regarding bidders/event/inventory;
Asset interest indicator;
Second highest bidder manipulation;
"Bidding in the lane" manipulation;
Integration into consignors' content management strategy; and
Constantly changing auctioning platform—for all segments—that changes based on up-to-the-second market trending;
System infrastructure display for staff review, including:
User counts;
User activity (e.g., bid counts);
Performance scalability (e.g., network, clerk clicks, audio/video, etc.)
Customization of System—Auto-Learning In various embodiments, a customization capability may allow the users of the platform to customize the format, look, data, organization, etc., of all components of the overall system. This capability may be implemented in a one-size-fits-one fashion to allow for greater consistency. For example, the system may accommodate user preferences relating to business, behavioral, and psychological needs/desires as well as maximized productivity. Each time a user customizes a component, the customization is captured and stored in the data warehouse for the advancement of a smart system. Thus, with each change or customization, the system grows smarter in its operation.

As a few non-limiting examples, the system may be provided with catalogs. The catalogs may include videos, pictures, etc. From a buyer's perspective, the catalogs may be used to establish current backlog of product and inventory needs. From a seller's perspective, the catalogs may be used to effectively and efficiently manage inventory as well as evaluate the integration of the handling of assets such as the grouping of goods. Furthermore, information can be provided regarding "wrappers" associated with government or compliance requirements including, but not limited to, legislation/association mandates/etc., audit-readiness, and analytics/metrics and security obligations.

The customization may also benefit the user interface level of various embodiments of the system by allowing for the personalized manipulation of elements (e.g., multi-lingual and multi-currency capabilities) for all aspects of system usage, through and including reporting. In addition, the customization may allow for settings to be set for interfaces for all users (e.g., buyers/bidders, consignors, and viewers). Thus, various embodiments may include: (a) fully developed customization options; (b) feature/function selection ease; (c) ergonomic design; (d) data conversion into information; (e) electronic "assistant" for information management (e.g., avatar); (f) entertainment; (g) reporting; (h) decision-making triggers; and (i) tailorable features that harness the power of people's natural tendencies to be attracted to things that remind them of themselves.

System Operation

In operation, the system allows the seller/consignor/middleman to manage the content of all technology components based specifically on the need of the potential buyer. Complementing the content management system, a decision architecture engine may be included to analyze the user's activity contained in the data warehouse and present the content in a manner that optimizes the probability of a favorable reaction by the user. One of many benefits realized by the seller from the use of such a system is the ability to "manage eyeballs", as more fully described below. Beyond the extensive decision-making capability, the implementation of such a content management system can also be leveraged to train, entertain, engage psychology, create conversions, allow for experimentation, etc.

Thus, in the various embodiments, the content management system should be proficient and persuasive in the promotion of conversions and in the management of all participants.

The content management system should be proficient in the promotion of conversions to benefit the seller/consignor/middleman in any one or a combination of the following ways:
- Increase sales
- Drive traffic to specific destination(s)
- Build a profile list of qualified prospects
- Increase online presence and exposure
- Gain credibility and influence as a thought leader
- Connect with existing clients
- Validate a clear understanding of brand
- Correlate respective visits to the company's web-site or interest in the company's services (e.g., OLR, etc.) from social media platforms
- Satisfy requests for information
- Solicit industry participation
- Improve communications among customers and others in industry
- Provide channel for invitations to speak or contribute to an event, blog, or other online platform
- Receive unsolicited recommendations from the industry
- Allow customers to evangelize on the company's behalf
- Increase visits to company's trade show strategy due to social media exposure
- Improve awareness of company's brand as noted by the sales staff
- Improve awareness of company's brand as noted by media
- Improve awareness of company's brand as noted by online measurement goals
- Be recognized as a thought leader in a respective industry
- Participate in online communities (or groups) started by company
- Learn something meaningful about customers, market, competition, etc.
- Position for noticeable positive sentiment in how company is perceived
- Shorten sales cycles due to improved brand strength
- Create more sales opportunities due to improved brand strength
- Quantify and qualify traffic, buzz, leads, and sales
- Understand and implement a predictable process (preferably through automation) that converts a user from one destination to the next—until ultimate goal(s) for that user are realized—within all aspects of the company
- Determine the "value" of bidders in segment pools
- Understand the value attributable to each click
- Understand how to turn clicks into customers
- Create community
- Create a "real time" customer service program
- Seek electronic content awards (e.g., service, website, blog, podcasts, etc.)

Furthermore, the content management system should be proficient in the management of all participants—or participant "eyeballs"—to allow the auction house or consignor to extend any one or a combination of the following to the auction participants:
- Proactive monitoring of the health of users' systems
- Automated transaction processing (e.g., once a bidder wins, the purchase amount would be automatically deducted—including handling fees, shipping, etc.—from user's credit card, bank account, retainer, etc.)
- A buyer rating system based on credit risk (e.g., payment risk, timely pick-up, etc.) with bidder label categories (e.g., platinum, gold, silver, etc.), entitling the buyers to certain privileges
- Flipping of items (e.g., buyer can post purchase directly to website, e-Bay, etc.) as further described in United States Publication Numbers US 2008-0195523 A1 and US 2008-0195520 A1 which are incorporated by reference above
- Provision of information regarding alternative or additional items that the user may be interested in
- Simplified registration process to allow registrants to enter directly into the auction, if desired
- Self-policing qualifications (e.g., bidder always knows own credit limits; consumer knows what he can afford; bank-like valuation is provided, etc.).

The third element is the implementation of a persuasive conversion system that can be integrated into a prescribed framework and operate to provide services such as choreographing the seller's website, auction catalogs, customer service offerings/components, and integrating information from other similar sources (e.g., OnLine Ringman, XAP, ICE, etc.) so that the activity of the users can be fully understood and exploited, for instance, the information that identifies that User 123 viewed Item ABC a total of 14 times, spent 3 minutes on the detailed item page, and moved to the registration page, etc. Once information at this level of detail and specificity is added to the diagnostics derived from the enhancements detailed above, the reporting and analytics available to the auction house, the bidder, and the consignor can be utilized to have an impact on the behavioral characteristics in the psychology-driven auction business model and open up additional economic opportunities. It should be appreciated that conversion as described herein is part science and part art, and it relies to some extent on understanding the psychology and process of persuasion and adapting it to the online medium. Conversion should be viewed as a complex system, the success of which depends on the system's ability to address the varying levels of needs a user brings to the online experience.

To be effective, the system can address these user needs at every possible conversion point in the process. In some embodiments, it may be critical that the proper action be taken at the exact point of time action is required. When persuasive information is provided at the point when the customer's customers are getting ready to take an action, the greatest cognitive dissonance will be realized and the persuasion will have the most impact. The persuasion may be more effective if it follows the format of attention, interest, desire, action, and satisfaction. At the most fundamental level through and including the most advanced level, users are motivated by the question, "What's in it for me based on the value of the asset?"

In some embodiments, the persuasion of conversion is enhanced by administering one or more of the following:
- Quantifying and qualify traffic/buzz/leads/sales
- Implementing a predictable and automated process that converts a user on the website from one destination to the next—within all aspects of the website—until buying or selling is realized
- Implementing a conversion strategy within customers' customer's content management plan, including social networking
- Determining how much the participant is worth to the auction
- Understanding the value attributable to each click
- Understanding how to turn clicks into customers
- Developing segment portals of "valued" bidders
- Developing system capabilities that provide for psychological persuasion on an individual basis. It is critical that the auction house be able to control the conditions that exist at the specific time that decisions are being made.

Advantageously, the various embodiments allow the users of the system to benefit from an adaptive content management system that is perpetually fed by data intelligence. The data intelligence leverages "adaptive results" from user profiles, trends, and psychology. Thus, as items are sold, funds expended, intelligence information gathered (such as perceived interest by one or more participates, bidding activity for similar or related products, etc.), the system can adapt and push elements of the auction in a different direction based on the updated information.

Figure 7:
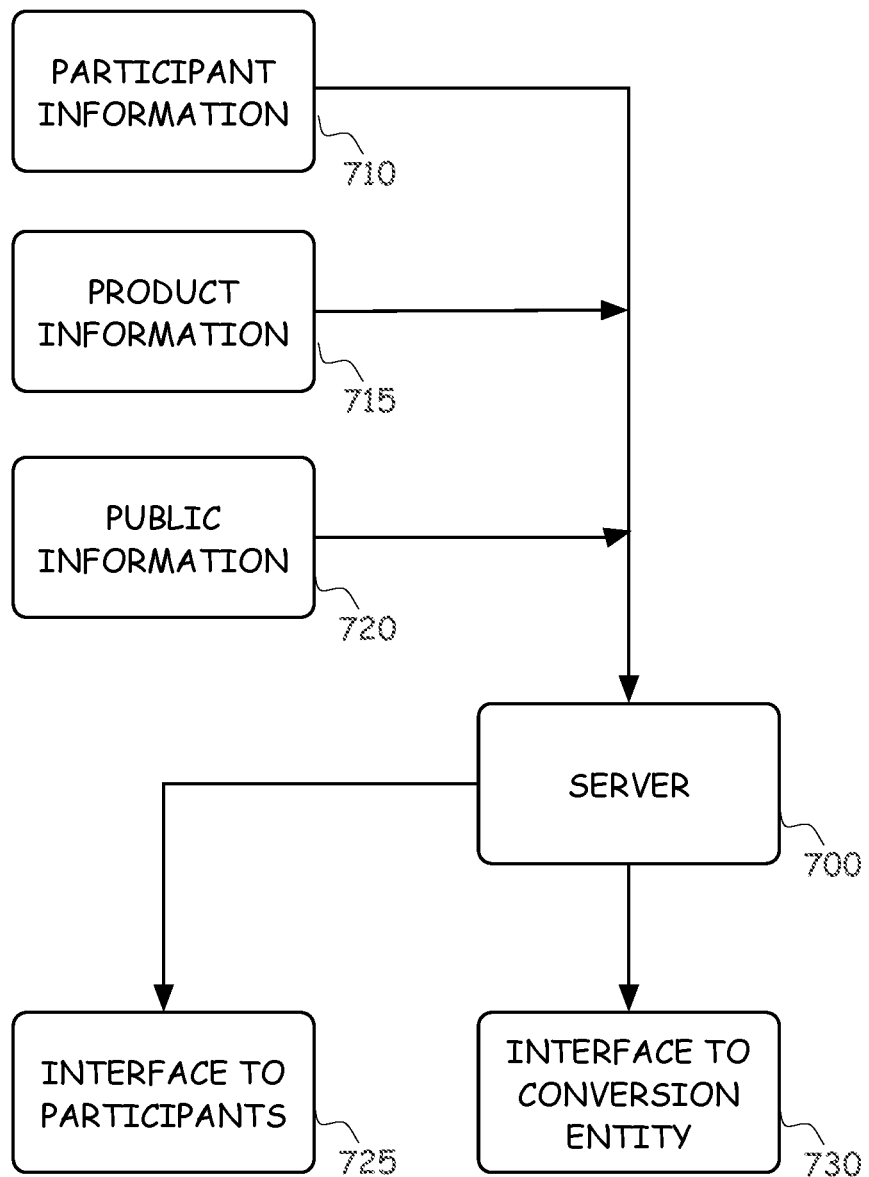
FIG. 7 is a block diagram illustrating the operation of an exemplary embodiment of the GOG.

FIG. 7 is a block diagram illustrating the operation of an exemplary embodiment of the GOG. A server 700, which may be a single server or multiple servers working in tandem, serves as the central processor for generation of the guaranteed offer. The server 700 includes input from a variety of sources. The variety of sources has been grouped into three categories in the illustrated embodiment: (1) participant information 710, (b) product information 715, and (c) public information 720. The participant information 710 conforms to the various sources identified in FIG. 5 and includes customer or potential buyer information and profiles as well as seller information and profiles. The product information 715 conforms to the various sources identified in FIG. 3 and includes information about the actual products or services being auctioned as well as the ancillary services and products that may be associated with the products or needed by the participants. The public information 720 may include information from a wide variety of sources that can be pulled in to facilitate the control of the psychology of the auctioning environment in any of a variety of manners as well as facilitate the identification of combinatorial auction packages that can be presented to participants to create the multi-dimensional auctioning environment.

As an example of the latter function, the server may search for, identify, and work out the arrangements for items (products and/or services) to be pulled in from other sources, including other conversion activities, which can then be presented in packages for bidding. For instance, if it is determined heuristically that a certain bidder or set of bidders would be drawn into participation, such items/services can be identified, obtained, or reserved and offered into the auction inventory as packaged items. For instance, in some embodiments, the server 700 may actively engage in the process of acquiring the items or services in anticipation that additional profit will be realized by the ultimate repackaging of the items or services within the current auctioning environment. For instance, if a fleet of passenger van vehicles are being auctioned and it is determined that multiple parties registered for the auction provide people transportation services, the GOG consider the effect of pulling a lot of parts that are suitable for the particular vehicles, advertising services that are available for increasing passenger takes, routes that can be purchased for transporting passengers, etc., and buddle one or more such items/services into a package with the fleet of vehicles.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method within a computer-implemented auction system for automatically generating guaranteed offers for assets within a lot of assets to be offered in a plurality of conversion events for different buyer audiences, the method comprising the actions of:

the auction system receiving the identification of a target lot to be listed for acquisition;

the auction system identifying the assets within the target lot;

the auction system conducting a baseline price assessment of the target lot to identify a baseline price;

the auction system conducting a depreciation assessment of the assets within the target lot to obtain a depreciation value;

the auction system automatically conducting a demographics assessment for the target lot by:
identifying a buying audience for each of the plurality of conversion events;
identifying an interest level of each buying audience; and
set a demographics value for each conversion event commensurate with the interest level of that buying audience for that conversion event;

the auction system conducting a conversion probability assessment of the target lot to obtain a probability adjustment value;

the auction system performing a real-time adjustment of the baseline price for the target lot in view of the depreciation value, the demographics value and the probability adjustment value for each buying audience and each conversion event of the plurality of conversion events; and the auction system sequentially presenting the asset lot in each of the plurality of conversion events at the adjusted baseline price as the guaranteed offer for the target lot for the buying audience associated with the conversion event.

2. The method of claim 1, wherein the action of conducting a baseline price assessment of the target lot further comprises the real-time actions of the auction system:

identifying sales of comparable items to the assets within target lot;

identifying the prices obtained in the identified sales of the comparable items and a condition value of each of the comparable items;

conducting a condition evaluation of the assets in the target lot;

comparing the results of the condition evaluation to a set of expected results based on the identity of the assets in the target lot;

based on the results of the comparison, assigning a condition value to the target lot; and selecting a baseline price for the target lot by comparing the condition value of the assets in the target lot to prices obtained for comparable items with proximate condition values.

3. The method of claim 1, wherein the action of conducting a depreciation assessment of the target lot to obtain a depreciation value further comprises the real-time actions of the auction system:
identifying the age of the assets in the target lot;
analyzing price and date of prior sales of comparable items and age of comparable items to identify depreciation trends; and
assigning the depreciation value based at least in part on the analysis.

4. The method of claim 1, wherein the action of conducting a depreciation assessment of the target lot to obtain a depreciation value further comprises the real-time actions of the auction system:
identifying purchase price, salvage value and life span of the assets in the target lot;
calculating the depreciation using one of the following techniques: straight light depreciation, double-declining balance depreciation and sum of years depreciation; and
assigning the depreciation value based the calculations.

5. The method of claim 4, wherein the action of conducting a conversion probability assessment of the target lot to obtain a probability adjustment value further comprises the real-time actions of the auction system:
identifying a set of comparable items to the assets in the target lot that were placed on the market;
identifying the offer price and the depreciated value for each of the comparable items in the set of comparable items;
identifying the selling price for each of the comparable items in the set of comparable items that sold, and identify the comparable items in the set of comparable items that did not sell; and
applying a normalization algorithm to identify the conversion probability for the target item.

6. The method of claim 5, wherein the action of applying a normalization algorithm to identify the conversion probability for the target lot further comprises the real-time actions of the auction system:
creating groupings of the comparable items based on the value of the difference between the offering price and the depreciated value of each comparable device;
identify the number of offers and the number of sales within each grouping;
calculate the percentage of conversions for each grouping;
select groupings at or above a particular percentage threshold.

7. The method of claim 1, wherein the action of conducting a demographics assessment of the target item to obtain a demographics value further comprises the real-time actions of the auction system:
assigning a value to each of a plurality of buyer interest segments consisting of user profiles, company profiles, historical performance, market profiles and cross-correlation;
assessing each of the buyer interest segments to ascertain any decreases in the assigned value to identify an actual segment value;
summing the actual segment values; and
set the demographics value commensurate with the sum of the actual segment values.

8. A computer system for automatically generating real-time guaranteed offers for assets in a target lot of assets to be offered in a plurality of conversion events for different buyer audiences, the system comprising:
a processor,
a memory element containing instructions which when executed by the processor provides the functions of:
an asset identification engine configured to:
receive a target lot that is to be listed for acquisition;
identify the assets within a received target lot;
a baseline price assessment engine configured to conduct a baseline price assessment of the target lot to identify a baseline price;
a depreciation assessment engine configured to conduct a depreciation assessment of the target lot to obtain a depreciation value;
a demographics assessment engine configured to automatically conduct a demographics assessment of the target lot by:
identifying a buying audience for each of the plurality of conversion events;
conducting a demographics assessment of the target lot to obtain a demographics value for each identified buying audience;
identifying an interest level of each buying party audience; and
setting a demographics value for each conversion event commensurate with the interest level of that audience for that conversion event;
a conversion probability assessment engine configured to conduct a conversion probability assessment of the target lot to obtain a probability adjustment value;
the processor further configured to modify in real-time the baseline price for the target lot to generate a modified baseline price for each of the plurality of conversion events in view of the depreciation value, the probability adjustment value and the demographics value for each identified buying audience; and
sequentially presenting the target asset lot in each of the plurality of conversion events at the modified baseline price as the guaranteed offer for the target lot for each identified buying audience in each of the conversion events.

9. The system of claim 8, wherein the baseline price assessment engine is configured to:
identify sales of comparable items to the assets in the target lot;
identify the prices obtained in the identified sales of the comparable items and a condition value of each of the comparable items;
conduct a condition evaluation of the assets in the target lot;
compare the results of the condition evaluation to a set of expected results based on the identity of the assets in the target lot;
based on the results of the comparison, assign a condition value to the target lot; and
select a base price for the target lot by comparing the condition value of the target item to prices obtained for comparable items with proximate condition values.

10. The system of claim 8, wherein the depreciation assessment is configured to:
identify the age of the assets in the target lot;
analyze price and date of prior sales of comparable items and age of comparable items to identify depreciation trends; and assign the depreciation value based at least in part on the analysis.

11. The system of claim 8, wherein the depreciation assessment engine is configured to:
   identify purchase price, salvage value and life span of assets in the target lot;
   calculate the depreciation using one of the following techniques: straight light depreciation, double-declining balance depreciation and sum of years depreciation; and
   assign the depreciation value based the calculations.

12. The system of claim 11, wherein the conversion probability assessment engine is configured to:
   identify a set of comparable items to the assets in the target lot that were placed on the market;
   identify the offer price and the depreciated value for each of the comparable items in the set of comparable items;
   identify the selling price for each of the comparable items in the set of comparable items that sold, and identify the comparable items in the set of comparable items that did not sell; and
   apply a normalization algorithm for each asset in the target lot to identify the conversion probability for the target lot.

13. The system of claim 12, wherein the normalization algorithm is configured to:
   create groupings of the comparable items based on the value of the difference between the offering price and the depreciated value of each comparable device;
   identify the number of offers and the number of sales within each grouping;
   calculate the percentage of conversions for each grouping; and
   select groupings at or above a particular percentage threshold.

14. The system of claim 8, wherein the demographics assessment engine is further configured to:
   assign a value to each of a plurality of buyer interest segments consisting of user profiles, company profiles, historical performance, market profiles and cross-correlation;
   assess each of the buyer interest segments to ascertain any decreases in the assigned value to identify an actual segment value;
   sum the actual segment values; and
   set the demographics value commensurate with the sum of the actual segment values.

\* \* \* \* \*